United States Patent [19]
Takada et al.

[11] Patent Number: 6,108,221
[45] Date of Patent: Aug. 22, 2000

[54] PULSE WIDTH MODULATION CONVERTER

[75] Inventors: Kazuyuki Takada, Hirakata; Yoshinori Isomura, Itami, both of Japan

[73] Assignee: Matsushita Electric Industrial Co., Ltd., Osaka-fu, Japan

[21] Appl. No.: 09/331,719

[22] PCT Filed: Dec. 24, 1997

[86] PCT No.: PCT/JP97/04767

§ 371 Date: Jun. 25, 1999

§ 102(e) Date: Jun. 25, 1999

[87] PCT Pub. No.: WO98/29937

PCT Pub. Date: Jul. 9, 1998

[30] Foreign Application Priority Data

Dec. 25, 1996 [JP] Japan ................................ 8-344840

[51] Int. Cl.[7] ................................................ H02M 1/12
[52] U.S. Cl. ............................ 363/41; 363/37; 323/207
[58] Field of Search .................................. 363/34, 37, 40, 363/41, 89, 98; 323/207

[56] References Cited

U.S. PATENT DOCUMENTS 5,045,991  9/1991  Dhyanchand et al. ..................... 363/89
5,491,624  2/1996  Levran et al. ............................. 363/87
5,621,627  4/1997  Krawchuk et al. ....................... 363/37

OTHER PUBLICATIONS

Jiang, Y. et al.: "Simple High Performance Three–Phase Boost Rectifiers", Proceedings of the Annual Power Electronics Specialists Conference, Taipei, Taiwan, Jun. 20–24, 1994, vol. vol. 2, No. Conf. 25, Jun. 20, 1994, Society, pp. 1158–1163, XP000510342, see Figure 2.

*Primary Examiner*—Jessica Han
*Attorney, Agent, or Firm*—Wenderoth, Lind & Ponack, L.L.P.

[57] ABSTRACT

A PWM converter includes a power source current detector (9), current instruction generator (7), current controller (6) and a main circuit power control section (8), and the current controller is constituted of comparators (17, 18, 19) which compare the line current measurement results with the line current instruction values, and a logic circuit (10) which generates switching instruction signals (PU, PV, PW) based on the comparison results with use of timing signals so that the switching power devices (Q1–Q6) are selectively turned ON and OFF in the direction of reducing the difference between the line current measurement results and the line current instruction values, and thus essentially solves the prior art problems associated with gain adjustment of current error amplifiers, which is completely adjustment-free and yet inexpensive.

11 Claims, 16 Drawing Sheets

Fig.3

| State No. | RESET | CLK10 | HU | HV | HW | PU | PV | PW |
|---|---|---|---|---|---|---|---|---|
| A00 | L | ↑ | L | H | H | H | L | L |
| AX1 | L | ◆ | * | L | H | H | H | L |
| AX2 | L | ◆ | * | L | L | H | H | H |
| A00 | L | ↑ | L | H | H | H | L | L |
| AY1 | L | ◆ | * | H | L | H | L | H |
| AY2 | L | ◆ | * | L | L | H | H | H |
| B00 | L | ↑ | H | L | H | L | H | L |
| BX1 | L | ◆ | L | * | H | H | H | L |
| BX2 | L | ◆ | L | * | L | H | H | H |
| B00 | L | ↑ | H | L | H | L | H | L |
| BY1 | L | ◆ | H | * | L | L | H | H |
| BY2 | L | ◆ | L | * | L | H | H | H |
| C00 | L | ↑ | H | H | L | L | L | H |
| CX1 | L | ◆ | L | H | * | H | L | H |
| CX2 | L | ◆ | L | L | * | H | H | H |
| C00 | L | ↑ | H | H | L | L | L | H |
| CY1 | L | ◆ | H | L | * | L | H | H |
| CY2 | L | ◆ | L | L | * | H | H | H |
| D00 | L | ↑ | H | L | L | L | H | H |
| DX1 | L | ◆ | * | H | L | L | L | H |
| DX2 | L | ◆ | * | H | H | L | L | L |
| D00 | L | ↑ | H | L | L | L | H | H |
| DY1 | L | ◆ | * | L | H | L | H | L |
| DY2 | L | ◆ | * | H | H | L | L | L |
| E00 | L | ↑ | L | H | L | H | L | H |
| EX1 | L | ◆ | H | * | L | L | L | H |
| EX2 | L | ◆ | H | * | H | L | L | L |
| E00 | L | ↑ | L | H | L | H | L | H |
| EY1 | L | ◆ | L | * | H | H | L | L |
| EY2 | L | ◆ | H | * | H | L | L | L |
| F00 | L | ↑ | L | L | H | H | H | L |
| FX1 | L | ◆ | H | L | * | L | H | L |
| FX2 | L | ◆ | H | H | * | L | L | L |
| F00 | L | ↑ | L | L | H | H | H | L |
| FY1 | L | ◆ | L | H | * | H | L | L |
| FY2 | L | ◆ | H | H | * | L | L | L |
| G00 | L | ↑ | H | H | H | L | L | L |
| H00 | L | ↑ | L | L | L | H | H | H |
| CLR | H | ◆ | * | * | * | L | L | L |

Fig.6A
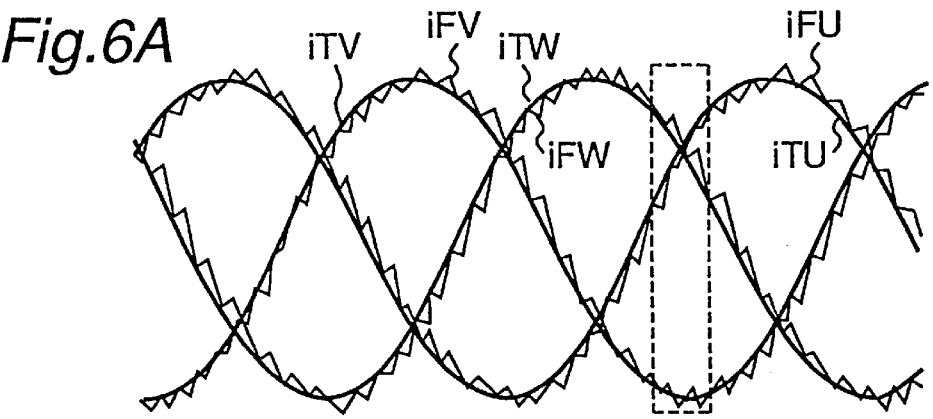
Fig.6B
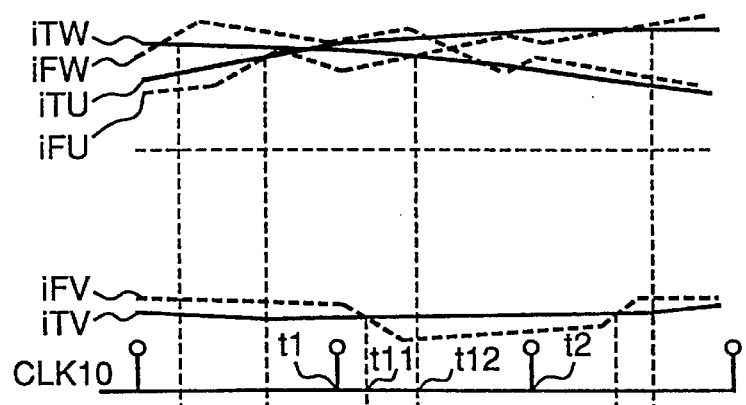
Fig.6C
| N0 | E00 | EY1 | EY2 | A00 | AX1 | AX2 | F00 | FY1 | FY2 |
|---|---|---|---|---|---|---|---|---|---|
| HU | L | L | H | L | * | * | L | L | H |
| HV | H | * | * | H | L | L | L | H | H |
| HW | L | H | H | H | H | L | H | * | * |
| PU | H | H | L | H | H | H | H | H | L |
| PV | L | L | L | L | H | H | H | L | L |
| PW | H | L | L | L | L | H | L | L | L |
| Q1 | X | X | O | X | X | X | X | X | O |
| Q2 | O | O | O | O | X | X | X | O | O |
| Q3 | X | O | O | O | O | X | O | O | O |
| Q4 | O | O | X | O | O | O | O | O | X |
| Q5 | X | X | X | X | O | O | O | X | X |
| Q6 | O | X | X | X | X | O | X | X | X |
O : ON   X : OFF

Fig.9

| State No. | RESET | CLK10 | HU | HV | HW | PU | PV | PW |
|---|---|---|---|---|---|---|---|---|
| A00 | L | ↑ | L | H | H | H | L | L |
| AX1 | L | ◆ | * | L | H | H | H | L |
| AX2 | L | ◆ | * | L | L | L | L | L |
| A00 | L | ↑ | L | H | H | H | L | L |
| AY1 | L | ◆ | * | H | L | H | L | H |
| AY2 | L | ◆ | * | L | L | L | L | L |
| B00 | L | ↑ | H | L | H | L | H | L |
| BX1 | L | ◆ | L | * | H | H | H | L |
| BX2 | L | ◆ | L | * | L | L | L | L |
| B00 | L | ↑ | H | L | H | L | H | L |
| BY1 | L | ◆ | H | * | L | L | H | H |
| BY2 | L | ◆ | L | * | L | L | L | L |
| C00 | L | ↑ | H | H | L | L | L | H |
| CX1 | L | ◆ | L | H | * | H | L | H |
| CX2 | L | ◆ | L | L | * | L | L | L |
| C00 | L | ↑ | H | H | L | L | L | H |
| CY1 | L | ◆ | H | L | * | L | H | H |
| CY2 | L | ◆ | L | L | * | L | L | L |
| D00 | L | ↑ | H | L | L | L | H | H |
| DX1 | L | ◆ | * | H | L | L | L | H |
| DX2 | L | ◆ | * | H | H | H | H | H |
| D00 | L | ↑ | H | L | L | L | H | H |
| DY1 | L | ◆ | * | L | H | L | H | L |
| DY2 | L | ◆ | * | H | H | H | H | H |
| E00 | L | ↑ | L | H | L | H | L | H |
| EX1 | L | ◆ | H | * | L | L | L | H |
| EX2 | L | ◆ | H | * | H | H | H | H |
| E00 | L | ↑ | L | H | L | H | L | H |
| EY1 | L | ◆ | L | * | H | H | L | L |
| EY2 | L | ◆ | H | * | H | H | H | H |
| F00 | L | ↑ | L | L | H | H | H | L |
| FX1 | L | ◆ | H | L | * | L | H | L |
| FX2 | L | ◆ | H | H | * | H | H | H |
| F00 | L | ↑ | L | L | H | H | H | L |
| FY1 | L | ◆ | L | H | * | H | L | L |
| FY2 | L | ◆ | H | H | * | H | H | H |
| G00 | L | ↑ | H | H | H | L | L | L |
| H00 | L | ↑ | L | L | L | H | H | H |
| CLR | H | ◆ | * | * | * | L | L | L |

Fig. 13A
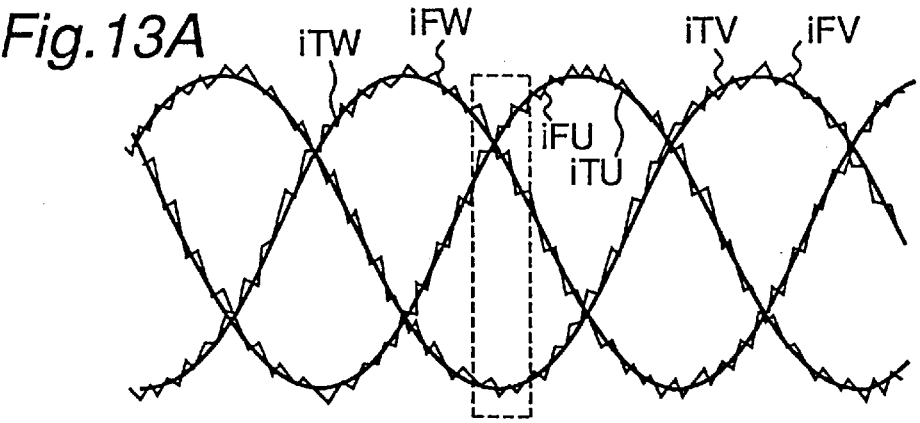
Fig. 13B
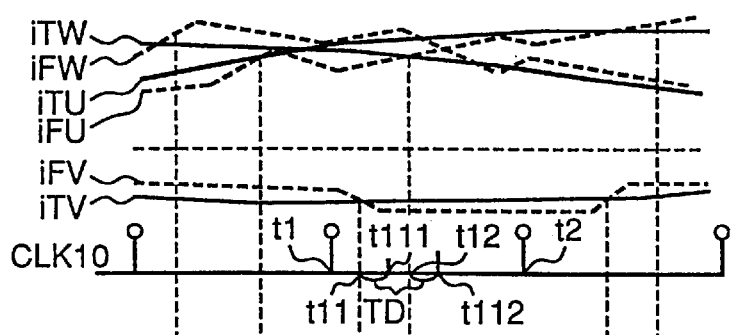
Fig. 13C
| | E00 | | | A00 | | AX1 | FY1 | | |
|---|---|---|---|---|---|---|---|---|---|
| | N0 | EY1 | EY2 | | AX2 | F00 | | FY2 |
| HU | L | L | H | L | * | * | L | L | H |
| HV | H | * | * | H | L | L | L | H | H |
| HW | L | H | H | H | H | L | H | * | * |
| PU | H | H | L | H | H | H | H | H | L |
| PV | L | L | L | H | H | H | H | L | L |
| PW | H | L | L | L | L | H | L | L | L |
| PU1 | H | H | L | H | H | H | H | H | L |
| PV1 | L | L | L | L | H | H | H | L | L |
| PW1 | H | L | L | L | L | H | L | L | L |
| Q1 | X | X | O | X | X | X | X | X | O |
| Q2 | O | O | O | O | X | X | X | O | O |
| Q3 | X | O | O | O | O | X | O | O | O |
| Q4 | O | O | X | O | O | O | O | O | X |
| Q5 | X | X | X | X | O | O | O | X | X |
| Q6 | O | X | X | X | X | O | X | X | X |
O : ON    X : OFF

PULSE WIDTH MODULATION CONVERTER

TECHNOLOGICAL FIELD

The present invention relates to a pulse width modulation converter (referred to as "PWM converter" hereinafter), in particular to a PWM converter for converting three-phase AC power to DC power.

BACKGROUND ART

In recent years, PWM converters have been widely used with an object of transmitting and receiving electric power in both directions from an AC power source to a DC power source or from a DC power source to an AC power source.

PWM converters are also often used with an object of reducing a phase difference of voltage and current of an AC power source, i.e., for the purpose of improving a power factor, and suppressing current distortion of an AC power source, i.e., reducing higher harmonics of the power source.

A typical conventional PWM converter system will now be described with reference to FIGS. 14 to 17.

In FIG. 14, it is assumed that a voltage between a plus terminal and a minus terminal of a smoothing capacitor 60 is higher than the maximum value of a phase voltage of a three-phase AC power source 1. First of all, in a current instruction generator 7, a phase information value θ and amplitude instruction value ip of the three-phase AC current wave form to be supplied from the three-phase AC power source 1 are set, and on the basis of these values of information, the current instruction generator 7 generates respective line current instructions that are to be input from the three-phase AC power source 1: these are first line current instruction iTU, second line current instruction iTV, and third line current instruction iTW.

Next, a power source current detector 9 detects two line currents of the three line currents output from the three-phase AC power source 1 and the remaining one line current is then obtained by taking the sum of the two detected line currents and inverting the sign thereof, and the obtained three line currents are output as the first line current measurement result iFU, second line current measurement result iFV, and third line current measurement result iFW. It should be noted here that this power source current detector 9 may be also constructed to detect the three line currents of the three-phase AC power source 1, outputting these as first line current measurement result iFU, second line current measurement result iFV and third line current measurement result iFW.

Next, a current controller 106 receives these first line current instruction iTU, second line current instruction iTV, third line current instruction iTW, and first line current measurement result iFU, second line current measurement result iFV, and third line current measurement result iFW to be compared, respectively, and generates a first switching instruction signal PU, second switching instruction signal PV, and third switching instruction signal PW controlling such that, the first line current instruction iTU and first line current measurement result iFU, the second line current instruction iTV and second line current measurement result iFV, and the third line current instruction iTW and third line current measurement result iFW are respectively coincident with each other as closely as possible.

Next, a main circuit power control section 8 includes the smoothing capacitor 60 and a switching power device group having a three-phase bridge construction. The switching power device group is comprised of a first switching power device Q1 connected to the plus terminal of the smoothing capacitor 60 for controlling the first line current IU, second switching power device Q2 connected to the plus terminal of the smoothing capacitor 60 for controlling the second line current IV, third switching power device Q3 connected to the plus terminal of the smoothing capacitor 60 for controlling the third line current IW, fourth switching power device Q4 connected to the minus terminal of the smoothing capacitor 60 for supplying the first line current IU to the three-phase AC power source 1, fifth switching power device Q5 connected to the minus terminal of the smoothing capacitor 60 for controlling the second line current IV, sixth switching power device Q6 connected to the minus terminal of the smoothing capacitor 60 for controlling the third line current IW, where each switching power device has a reflux diode connected in parallel thereto.

By this construction, any one of the first switching power device Q1 and fourth switching power device Q4 is turned ON in response to the first switching instruction signal PU, any one of the second switching power device Q2 and fifth switching power device Q5 is turned ON in response to the second switching instruction signal PV, and any one of the third switching power device Q3 and sixth switching power device Q6 is turned ON in response to the third switching instruction signal PW.

The description is now given assuming an arrangement such that, when the first switching instruction signal PU is L level, the first switching power device Q1 is turned ON, while when the first switching instruction signal PU is H level, the fourth switching power device Q4 is turned ON, and when the second switching instruction signal PV is L level, the second switching power device Q2 is turned ON, while when the second switching instruction signal PV is H level, the fifth switching power device Q5 is turned ON, and when the third switching instruction signal PW is L level, the third power switching device Q3 is turned ON, while when the third switching instruction signal PW is H level, the sixth switching power device Q6 is turned ON.

In the case where the voltage between the plus terminal and minus terminal of the smoothing capacitor 60 gets below the maximum value of the phase voltage of the three-phase AC power source 1, the three-phase AC voltage is rectified by the reflux diodes of the switching power device group Q1 to Q6.

FIG. 15 shows a conventional construction of the current controller 106 included in the conventional PWM converter system shown in FIG. 14. Also, FIGS. 16A to 16E show an operation of FIG. 15.

In the current controller 106, the first, second and third line current instructions iTU, iTV, iTW and the first, second and third line current measurement results iFU, iFV, iFW are respectively subtracted by means of subtraction units 117, 118 and 119 so as to obtain first, second and third line current error signals iEU, iEV and iEW. The first, second and third line current error signals iEU, iEV and iEW are input to first, second and third current error amplifiers 120, 121, 122 respectively to output first, second and third voltage instruction signals VU, VV and VW to be fed to a three-phase PWM signal generator section 139. For each of the current error amplifiers 120 to 122, a PI type (proportional/integral type) amplifier is typically employed as shown in FIG. 17, and its gain characteristic is obtained by the following equation:

$$G = R2 \times (R3 \times C1 \times S) / [R1 \times \{(R2 + R3) \times C1 \times S + 1\}]$$

The three-phase PWM signal generator section 139 includes first, second and third comparators 123, 124 and 125 and a triangular wave generator 126 generating a triangular wave signal SC to be input to minus terminals of the first, second and third comparators 123, 124 and 125. The first, second and third comparators 123, 124 and 125 receives the first, second and third voltage instruction signals W, VV and VW at their plus input terminals and compare the respective voltage instruction signals W, VV, and VW with the triangular wave signal SC, to thereby generate the first, second and third switching instruction signals PU, PV and PW.

In this construction, it is assumed that, when the voltage instruction signals W, VV and VW are respectively larger than the triangular wave signal SC, the first, second and third comparators 123, 124 and 125 generate H level, and in the meanwhile, when smaller, the comparators generate L level.

FIGS. 16A to 16E show the operation of the current controller 106 shown in FIG. 15, noting here that the operation is shown for the case where the first, second and third line current instructions iTU, iTV and iTW are three-phase sine waves.

In FIG. 15 and FIGS. 16A to 16E, in considering the gain of the current error amplifiers 120 to 122, it can be seen that, the larger the gain of the current error amplifiers, the nearer the line current instructions and line current measurement results approach each other and the line current errors can be made small, improving the response characteristic of the line current measurement results with respect to the line current instructions.

However, with the above conventional construction, due, for example, to phase lag produced by reactors 59, phase lag of the current error amplifiers, and dead time delay in the three-phase PWM signal generator section 139, if the gain of the current error amplifiers is made too large, oscillation phenomenon occurs. Therefore, normally chosen is a value of the current error amplifier gain as large as possible in a range such that oscillation does not occur. This gain value of each current error amplifier is determined at the design stage by studying the loop transfer function of the current control loop from the viewpoint of the characteristics of the three-phase AC power source 1, reactors 59, power source current detector 9, current controller 8 and main circuit power control section 8. In determination of the gain, it is necessary to lower the gain to a degree where oscillation does not occur even in the worst case, taking into account manufacturing variation of these characteristics and temperature characteristics. The task of determining this gain requires a lot of effort in design and on-site and requires considerable efforts in management in manufacture and on-site.

Also, since the optimum gain of the current error amplifiers changes depending on the DC voltage, a system must be constructed in which the gain is variable.

Next, there is a problem that, because the offset and/or drift of the triangular wave generator and the current error amplifier per se have an adverse effect on the current control error and/or restrict the range of dynamic drift, operational amplifiers are required such that the offset and drift of these components are small, and in some cases an offset adjustment operation is necessary during a manufacture process, which increases costs.

It should be noted that, although FIG. 15 is a conventional example in which the current controller 106 is implemented by analogue circuitry, the first, second and third line current measurement results iFU, iFV, iFW can be converted to digital data and the same constitution can be implemented by digital circuitry such as a microcomputer. Even in this case, the gain of the current error amplifiers must be determined by studying the loop transfer function of the current control loop in view of the characteristics of the three-phase AC power source, power source current detector, current controller and main circuit power control section, and this task is the same as in the case of implementation by analogue circuitry.

Furthermore, when the current error amplifiers are implemented using digital circuitry such as a microcomputer, since the offset and drift of the current error amplifiers themselves are digital calculations, they can be eliminated. However, phase lag gets larger as such calculation processing time increases and this tends to facilitate oscillation. This results in the problem that gain can not be increased without making the processing time very short, necessitating the use of a microcomputer or the like of very fast calculation processing capability, which is expensive undesirably.

Also regarding the A/D converter for converting the first, second and third line current measurement results iFU, iFV, iFW to digital data, phase lag increases as the conversion time gets longer, which facilitates to cause oscillation. This results in that the gain could not be increased without making the conversion time very short, necessitating the use of an A/D converter of very fast conversion capability, which is expensive. Also, offset and drift in the A/D conversion adversely affect the current control error and restrict the dynamic range, and therefore an A/D converter must be selected to have very small offset and drift, resulting in the problem of high cost.

DISCLOSURE OF INVENTION

Therefore, the present invention has been developed to solve the problems inherent to the conventional system, and an essential object thereof is to provide a PWM converter of low cost, without requirement of gain adjustment at all, having an excellent response characteristic of line current measurement results with respect to line current instructions.

In order to attain this object, according to a first aspect of the present invention, a PWM converter comprises: a power source current detector for detecting first, second and third line currents of a three-phase AC power source and generating first, second and third line current measurement results; a current instruction generator for generating first, second and third line current instruction values; a main circuit power control section which includes switching power means for controlling the first, second and third line currents; and a current controller which includes first, second and third comparators comparing the first, second and third line current measurement results with the first, second and third line current instruction values respectively to output first, second and third line current comparison results, and a logic circuit generating first, second and third switching instruction signals based on the first, second and third line current comparison results to switch the switching power means on and off in a manner such that the first, second and third line current measurement results coincide as closely with the first, second and third line current instruction values, respectively.

In this arrangement, the current controller further includes a timing signal generator generating a periodic state update timing signal to be applied to the logic circuit so that the logic circuit determines the levels of the switching instruction signals for putting the switching power means on and off at the timing of change in the line current comparison results in accordance with the state update timing signal.

The first, second and third comparators output the line current comparison results of a first level when the first, second and third line current measurement results are larger than the first, second and third line current instruction values, respectively, and output the line current comparison results of a second level when the first, second and third line current measurement results are smaller than the first, second and third line current instruction values, respectively, and wherein said switching power means is comprised of first, second, third, fourth, fifth and sixth switching power devices, so that the logic circuit determines the levels of the switching instruction signals for putting the first, second, third, fourth, fifth and sixth switching power devices in the on and off conditions, respectively.

By this arrangement, by repeating a simple operation of determining the respective ON or OFF condition of the first, second, third, fourth, fifth and sixth switching power devices in a direction of reducing the difference between the respective line current instructions and line current measurement results at the timing of changing the first, second and third line current comparison results and at the state update timing, the line currents of the three-phase AC power source can be made to approach the respective line current instruction signals and therefore the line current errors can thereby be reduced.

With the PWM converter of the present invention, the construction has no current error amplifier provided, so the problems involved in gain adjustment of a current error amplifier can be essentially solved and no gain adjustment is necessary at all.

Furthermore, even if there are changes in the characteristics and specification of the three-phase AC power source, power source current detector, current controller, or main circuit power control section, the line current errors are always made minimum, and even in the presence of manufacturing variation of performance and temperature characteristics etc., the line current errors can be always made minimum so that current control response can be made excellent and there is no risk of oscillation.

Also, except for the first, second and third comparator means, the current controller in the PWM converter according to the present invention can be constructed entirely of simple digital circuitry, and thus the portion constructed of digital circuitry has no risk of offset or drift, with reduction in cost.

According to a second aspect of the present invention, the logic circuit is adapted to determine the switching instruction signals such that, at said state update timing, when the first line current comparison result is of a first level and the second line current comparison result is of a second level and the third line current comparison result is of a second level, the second, third and fourth switching power devices are switched to the off condition while the first, fifth and sixth switching power devices are switched to the on condition, and then in the subsequent period from the time-point where the second line current comparison result becomes of a first level up to a time-point of the next state update timing, the fifth switching power device is switched to the off condition while the second switching power device is switched to the on condition, and then in the subsequent period from the timepoint where the third line current comparison result becomes of a first level up to a time-point of the next state update timing, the sixth switching power device is switched to the off condition while the third switching power device is switched to the on condition; and at said state update timing, when the first line current comparison result is of a second level and the second line current comparison result is of a first level and the third line current comparison result is of a second level, the first, third and fifth switching power devices are switched to the off condition while the second, fourth and sixth switching power devices are switched to the on condition, and then in the subsequent period from the time-point where the first line current comparison result becomes of a first level up to a time-point of the next state update timing, the fourth switching power device is switched to the off condition while the first switching power device is switched to the on condition, and then in the subsequent period from the time-point where the third line current comparison result becomes of a first level up to a time-point of the next state update timing, the sixth switching power device is switched to the off condition while the third switching power device is switched to the on condition; and at said state update timing, when the first line current comparison result is of a second level and the second line current comparison result is of a second level and the third line current comparison result is of a first level, the first, second and sixth switching power devices are switched to the off condition while the third, fourth and fifth switching power devices are switched to the on condition, and then in the subsequent period from the time-point where the first line current comparison result becomes of a first level up to a time-point of the next state update timing, the fourth switching power device is switched to the off condition while the first switching power device is switched to the on condition, and then in the subsequent period from the timepoint where the second line current comparison result becomes of a first level up to a time-point of the next state update timing, the fifth switching power device is switched to the off condition while the second switching power device is switched to the on condition; and at said state update timing, when the first line current comparison result is of a second level and the second line current comparison result is of a first level and the third line current comparison result is of a first level, the first, fifth and sixth switching power devices are switched to the off condition while the second, third and fourth switching power devices are switched to the on condition, and then in the subsequent period from the time-point where the second line current comparison result becomes of a second level up to a time-point of the next state update timing, the second switching power device is switched to the off condition while the fifth switching power device is switched to the on condition, and then in the subsequent period from the time-point where the third line current comparison result becomes of a second level up to a time-point of the next state update timing, the third switching power device is switched to the off condition while the sixth switching power device is switched to the on condition; and at said state update timing, when the first line current comparison result is of a first level and the second line current comparison result is of a second level and the third line current comparison result is of a first level, the second, fourth and sixth switching power devices are switched to the off condition while the first, third and fifth switching power devices are switched to the on condition, and then in the subsequent period from the time-point where the first line current comparison result becomes of a second level up to a time-point of the next state update timing, the first switching power device is switched to the off condition while the fourth switching power device is switched to the on condition, and then in the subsequent period from the time-point where the third line current comparison result becomes of a second level up to a time-point of the next state update timing, the third switching power device is switched to the off condition while the sixth switching power device is switched to the on condition; and at said state update timing, when the first line current comparison result is of a first level and the second line current comparison result is of a first level and the third line current comparison result is of a second level, the third, fourth and fifth switching power devices are switched to the off condition while the first, second and sixth switching power devices are switched to the on condition, and then in the subsequent period from the time-point where the first line current comparison result becomes of a second level up to a time-point of the next state update timing, the first switching power device is switched to the off condition while the fourth switching power device is switched to the on condition, and then in the subsequent period from the time-point where the second line current comparison result becomes of a second level up to a time-point of the next state update timing, the second switching power device is switched to the off condition while the fifth switching power device is switched to the on condition.

According to a third aspect of the present invention, the logic circuit is adapted to determine the switching instruction signals such that, at said state update timing, when the first line current comparison result is of a first level and the second line current comparison result is of a second level and the third line current comparison result is of a second level, the second, third and fourth switching power devices are switched to the off condition while the first, fifth and sixth switching power devices are switched to the on condition, and when the second line current comparison result becomes of a first level prior to the third line current comparison result, the fifth switching power device is switched to the off condition while the second switching power device is switched to the on condition which the conditions remain up to a time-point where the third line current comparison result becomes of a first level, and then in the subsequent period from the time-point where the third line current comparison result becomes of a first level up to a time-point of the next state update timing, the first, second and third switching power devices are switched to the off condition while the fourth, fifth and sixth switching power devices are switched to the on condition, whereas when the third line current comparison result becomes of a first level prior to the second line current comparison result, the sixth switching power device is switched to the off condition while the third switching power device is switched to the on condition which the conditions remain up to a time-point where the second line current comparison result becomes of a first level, and then in the subsequent period from the time-point where the second line current comparison result becomes of a first level up to a time-point of the next state update timing, the first, second and third switching power devices are switched to the off condition while the fourth, fifth and sixth switching power devices are switched to the on condition; and at said state update timing, when the first line current comparison result is of a second level and the second line current comparison result is of a first level and the third line current comparison result is of a second level, the first, third and fifth switching power devices are switched to the off condition while the second, fourth and sixth switching power devices are switched to the on condition, and when the third line current comparison result becomes of a first level prior to the first line current comparison result, the sixth switching power device is switched to the off condition while the third switching power device is switched to the on condition which the conditions remain up to a time-point where the first line current comparison result becomes of a first level, and then in the subsequent period from the time-point where the first line current comparison result becomes of a first level up to a time-point of the next state update timing, the first, second and third switching power devices are switched to the off condition while the fourth, fifth and sixth switching power devices are switched to the on condition, whereas when the first line current comparison result becomes of a first level prior to the third line current comparison result, the fourth switching power device is switched to the off condition while the first switching power device is switched to the on condition which the conditions remain up to a time-point where the third line current comparison result becomes of a first level, and then in the subsequent period from the time-point where the third line current comparison result becomes of a first level up to a time-point of the next state update timing, the first, second and third switching power devices are switched to the off condition while the fourth, fifth and sixth switching power devices are switched to the on condition; and at said state update timing, when the first line current comparison result is of a second level and the second line current comparison result is of a second level and the third line current comparison result is of a first level, the first, second and sixth switching power devices are switched to the off condition while the third, fourth and fifth switching power devices are switched to the on condition, and when the first line current comparison result becomes of a first level prior to the second line current comparison result, the fourth switching power device is switched to the off condition while the first switching power device is switched to the on condition which the conditions remain up to a time-point where the second line current comparison result becomes of a first level, and then in the subsequent period from the time-point where the second line current comparison result becomes of a first level up to a time-point of the next state update timing, the first, second and third switching power devices are switched to the off condition while the fourth, fifth and sixth switching power devices are switched to the on condition, whereas when the second line current comparison result becomes of a first level prior to the first line current comparison result, the fifth switching power device is switched to the off condition while the second switching power device is switched to the on condition which the conditions remain up to a time-point where the first line current comparison result becomes of a first level, and then in the subsequent period from the time-point where the first line current comparison result becomes of a first level up to a time-point of the next state update timing, the first, second and third switching power devices are switched to the off condition while the fourth, fifth and sixth switching power devices are switched to the on condition; and at said state update timing, when the first line current comparison result is of a second level and the second line current comparison result is of a first level and the third line current comparison result is of a first level, the first, fifth and sixth switching power devices are switched to the off condition while the second, third and fourth switching power devices are switched to the on condition, and when the second line current comparison result becomes of a second level prior to the third line current comparison result, the second switching power device is switched to the off condition while the fifth switching power device is switched to the on condition which the conditions remain up to a time-point where the third line current comparison result becomes of a second level, and then in the subsequent period from the time-point where the third line current comparison result becomes of a second level up to a time-point of the next state update timing, the fourth, fifth and sixth switching power devices are switched to the off condition while the first, second and third switching power devices are switched to the on condition, whereas when the third line current comparison result becomes of a second level prior to the second line current comparison result, the third switching power device is switched to the off condition while the sixth switching power device is switched to the on condition which the conditions remain up to a time-point where the second line current comparison result becomes of a second level, and then in the subsequent period from the time-point where the second line current comparison result becomes of a second level up to a time-point of the next state update timing, the fourth, fifth and sixth switching power devices are switched to the off condition while the first, second and third switching power devices are switched to the on condition; and at said state update timing, when the first line current comparison result is of a first level and the second line current comparison result is of a second level and the third line current comparison result is of a first level, the second, fourth and sixth switching power devices are switched to the off condition while the first, third and fifth switching power devices are switched to the on condition, and when the third line current comparison result becomes of a second level prior to the first line current comparison result, the third switching power device is switched to the off condition while the sixth switching power device is switched to the on condition which the conditions remain up to a time-point where the first line current comparison result becomes of a second level, and then in the subsequent period from the time-point where the first line current comparison result becomes of a second level up to a time-point of the next state update timing, the fourth, fifth and sixth switching power devices are switched to the off condition while the first, second and third switching power devices are switched to the on condition, whereas when the first line current comparison result becomes of a second level prior to the third line current comparison result, the first switching power device is switched to the off condition while the fourth switching power device is switched to the on condition which the conditions remain up to a time-point where the third line current comparison result becomes of a second level, and then in the subsequent period from the time-point where the third line current comparison result becomes of a second level up to a time-point of the next state update timing, the fourth, fifth and sixth switching power devices are switched to the off condition while the first, second and third switching power devices are switched to the on condition; and at said state update timing, when the first line current comparison result is of a first level and the second line current comparison result is of a first level and the third line current comparison result is of a second level, the third, fourth and fifth switching power devices are switched to the off condition while the first, second and sixth switching power devices are switched to the on condition, and when the second line current comparison result becomes of a second level prior to the first line current comparison result, the second switching power device is switched to the off condition while the fifth switching power device is switched to the on condition which the conditions remain up to a time-point when the first line current comparison result becomes of a second level, and then in the subsequent period from the time-point where the first line current comparison result becomes of a second level up to a time-point of the next state update timing, the fourth, fifth and sixth switching power devices are switched to the off condition while the first, second and third switching power devices are switched to the on condition, whereas when the first line current comparison result becomes of a second level prior to the second line current comparison result, the first switching power device is switched to the off condition while the fourth switching power device is switched to the on condition which the conditions remain up to a time-point where the second line current comparison result becomes of a second level, and then in the subsequent period from the time-point where the second line current comparison result becomes of a second level up to a time-point of the next state update timing, the fourth, fifth and sixth switching power devices are switched to the off condition while the first, second and third switching power devices are switched to the on condition.

According to a fourth aspect of the present invention, the first, second and third comparators are adapted to periodically compare the first, second and third line current instruction values with the first, second and third line current measurement results, respectively, and the current controller further comprises first, second and third double-reading logic circuits respectively interconnected between the first, second and third comparators and the logic circuit adapted such that, in the case where the first, second and third line current measurement results are greater than the first, second and third line current instruction values at least successive two times, respectively, the first, second and third comparators output the first, second and third line current comparison results of a first level, and whereas, in the case where the first, second and third line current measurement results are smaller than the first, second and third line current instruction values at least successive two times, respectively, the first, second and third comparators output the first, second and third line current comparison results of a second level, respectively.

By this arrangement, noise superimposed on the output signals of the comparator means can be removed and even under conditions that are subject to noise generation, the line currents of the three-phase AC power source can be controlled to coincide accurately with the first, second and third line current instructions.

According to a fifth aspect of the present invention, the logic circuit further includes first, second and third delay units for delaying switching instruction signals by predetermined times in accordance with a predetermined rule to be fed to the main circuit power control section.

By this arrangement, the delay means output switching instruction signals of the first, second, third, fourth, fifth and sixth switching power devices to be delayed by a predetermined time at the timing of changing the first, second and third line current comparison results, the line currents of the three-phase AC power source can be made to coincide very closely with the line current instructions.

According to a sixth aspect of the present invention, the current instruction generator generates the first, second and third line current instruction signals, each consisting of a sine wave of in-phase or a sine wave of anti-phase with respect to each phase voltage, seen from the neutral point of the three-phase AC power source.

By this arrangement, a reduction in the phase difference between the phase voltages and the line currents i.e. improvement in the power factor can be achieved and since each line current can be controlled to a sine wave, distortion of the line currents can be suppressed i.e. higher harmonics of the power source can be reduced.

Thus, it can be seen that, in the PWM converter according to the present invention, by repetition of a simple operation in which the respective ON or OFF condition of the first, second, third, fourth, fifth and sixth main circuit switching power devices is determined in such a direction as to decrease the difference between the respective line current instructions and line current measurement results at the timing of changing the first, second and third line current comparison results and at the state update timing, the line currents of the three-phase AC power source can be made to approach the respective line current instruction signals and the line current errors can thereby be reduced. with the PWM converter of the present invention, the construction has no current error amplifier provided, so the problems involved in gain adjustment of a current error amplifier can be essentially solved and no gain adjustment is con necessary at all.

Furthermore, even if the characteristics and specification of the re actors, power source current detector, current controller or main circuit power control section are changed, the line current errors are always kept to be the minimum, and even if there is manufacturing variation of the characteristics or temperature characteristics etc., the line current errors are always kept to the minimum, and therefore excellent current control response can be provided and there is no risk of oscillation.

Also, even if the DC voltage changes, there is no need to adjust the gain and operation is always performed to keep the line current errors minimum.

Also, except for the first, second and third comparator means, the current controller in a PWM converter according to the present invention can be constructed entirely of simple digital circuitry, and there fore the portion constructed of digital circuitry has no risk of offset or drift and is of low cost.

BRIEF DESCRIPTION OF THE DRAWINGS

FIG. 3 is a truth value table of a logic circuit used in the first embodiment of the present invention;

FIGS. 6A, 6B and 6C are explanatory views given in explanation of the operation of FIG. 1 and FIG. 2;

FIG. 9 is a truth value table of a logic circuit used in the second embodiment of the present invention;

FIGS. 13A, 13B and 13C are explanatory views showing the operation of the current controller and delay unit delaying a switching instruction signal according to a fourth embodiment of the present invention;

BEST MODE FOR CARRYING OUT THE INVENTION

Figure 1:
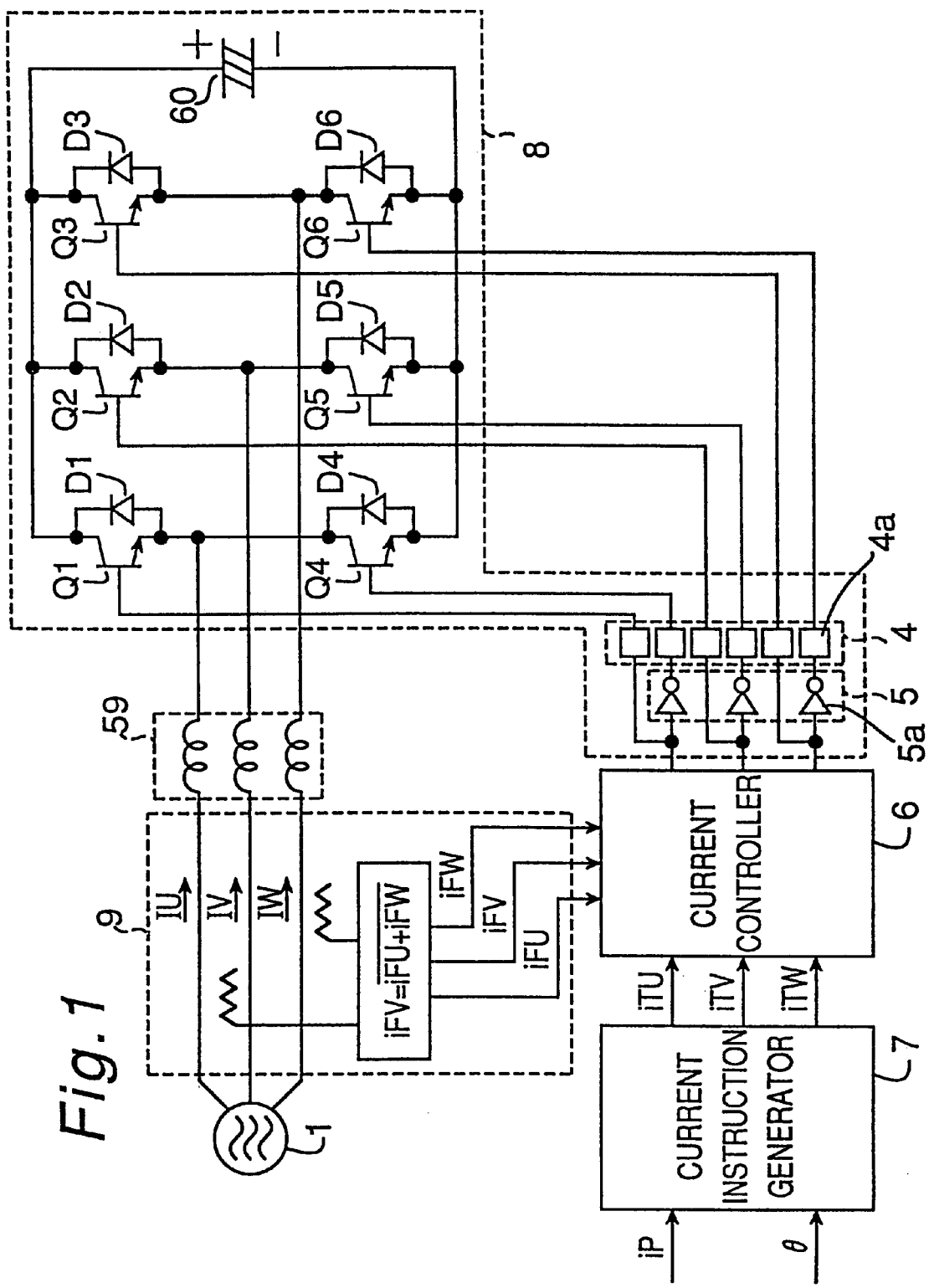
FIG. 1 is a block diagram of a PWM converter according to the present invention.

It is noted that, in the present invention, since the basic structures of the present embodiments are similar to that of the conventional one, like parts are designated by the same reference numerals throughout the drawings.

Embodiments of the present invention are described below with reference to the drawings.

(Embodiment 1)

FIG. 1 shows a construction of a PWM converter system according to a first embodiment of the present invention. In FIG. 1, the PWM converter system includes a power source current detector 9 for detecting line currents output from a three-phase AC power source 1, a current instruction generator 7 for generating line current instructions to be supplied from the three-phase AC power source 1, and a current controller 6 for comparing the line current instructions generated by the current instruction generator 7 with the current detection results supplied from the power source current detector 9 to control a main circuit power control section 8.

In the case where a voltage between a plus terminal and a minus terminal of a smoothing capacitor 60 included in the main circuit power control section 8 is higher than the maximum value of a phase voltage of the three-phase AC power source 1, a phase information value θ and amplitude instruction value ip of the three-phase AC current waveform to be supplied from the three-phase AC power source 1 are set in the current instruction generator 7 and then, based on these values of information, the current instruction generator 7 generates line current instructions to be supplied from the three-phase AC power source 1, i.e., as the first line current instruction iTU, second line current instruction iTV, and third line current instruction iTW, and these line current instructions are fed to the current controller 6.

The power source current detector 9 detects any two line currents of the three line currents IU, IV and IW output from the three-phase AC power source 1 and then the remaining one line current is obtained by taking the sum of the detected two line currents and inverting the sign thereof. Thus, the power source current detector 9 outputs these detected three line currents as the first line current measurement result iFU, second line current measurement result iFV, and third line current measurement result iFW. It should be noted here that the power source current detector 9 may be so constructed as to detect the three line currents of the three-phase AC power source 1 at the same time stage and to output these values as the first line current measurement result iFU, second line current measurement result iFV, and third line current measurement result iFW.

Next, the current controller 6 receives the first line current instruction iTU, second line current instruction iTV, and third line current instruction iTW from the current instruction generator 7 and the first line current measurement result iFU, second line current measurement result iFV, and third line current measurement result iFW from the current controller 6, to be compared therebetween, respectively, and then generates a first switching instruction signal PU, second switching instruction signal PV, and third switching instruction signal PW such that, the first line current instruction iTU coincides with the first line current measurement result iFU, the second line current instruction iTV coincides with the second line current measurement result iFV, and the third line current instruction iTW coincides with the third line current measurement result iFW, respectively, as closely as possible.

The operation of this current controller 6 will be described in detail later.

Next, the main circuit power control section 8 having the smoothing capacitor 60 further includes a main circuit switching power device group having a three-phase bridge construction which is comprised of a first switching power device Q1 having its collector connected to the plus terminal of the smoothing capacitor 60 for controlling the first line current IU, a second switching power device Q2 having its collector connected to the plus terminal of the smoothing capacitor 60 for controlling the second line current IV, a third switching power device Q3 having its collector connected to the plus terminal of the smoothing capacitor 60 for controlling the third line current IW, a fourth switching power device Q4 having its emitter connected to the minus terminal of the smoothing capacitor 60 for supplying the first line current IU to the three-phase AC power source 1, a fifth switching power device Q5 having its emitter connected to the minus terminal of the smoothing capacitor 60 for controlling the second line current IV, a sixth switching power device Q6 having its emitter connected to the minus terminal of the smoothing capacitor 60 for controlling the third line current IW, where the switching power devices Q1 to Q6 have reflux diode D1 to D6 connected in parallel therewith, respectively, and the emitters of the first to third switching power devices Q1 to Q3 are respectively connected to the collectors of the fourth to sixth switching power devices Q4 to Q6 in parallel.

The main circuit power control section 8 further includes a base drive section 4 having base drive units 4a and a logic inversion section 5 having logic inversion units 5a. Thus, the first, second and third switching instruction signals PU, PV and PW are supplied from the current controller 6 to the bases of the first, second and third switching power devices Q1, Q2 and Q3, respectively, via the base drive section 4, while the first, second and third switching instruction signals PU, PV and PW are also supplied to the bases of the fourth, fifth and sixth switching power devices Q4, Q5 and Q6, respectively, via the logic inversion section 5 and the base drive section 4.

By this arrangement, any one of the first switching power device Q1 and fourth switching power device Q4 is selectively turned ON in response to the first switching instruction signal PU, any one of the second switching power device Q2 and fifth switching power device Q5 is selectively turned ON in response to the second switching instruction signal PV, and any one of the third switching power device Q3 and sixth switching power device Q6 is selectively turned ON in response to the third switching instruction signal PW.

In this embodiment, the description is given assuming an arrangement such that, the first switching power device Q1 is turned ON when the first switching instruction signal PU is L level while the fourth switching power device Q4 is turned ON when the first switching instruction signal PU is H level, and the second switching power device Q2 is turned ON when the second switching instruction signal PV is L level while the fifth switching power device Q5 is turned ON when the second switching instruction signal PV is H level, and the third switching power device Q3 is turned ON when the third switching instruction signal PW is L level while the sixth switching power device Q6 is turned ON when the third switching instruction signal PW is H level.

Meanwhile, in the case where the voltage between the plus terminal and minus terminal of the smoothing capacitor 60 gets below the maximum value of the phase voltage of the three-phase AC power source 1, the three-phase AC voltage is rectified by the reflux diodes D1 to D6 of the switching power device group in the main circuit power control section 8.

Figure 2:
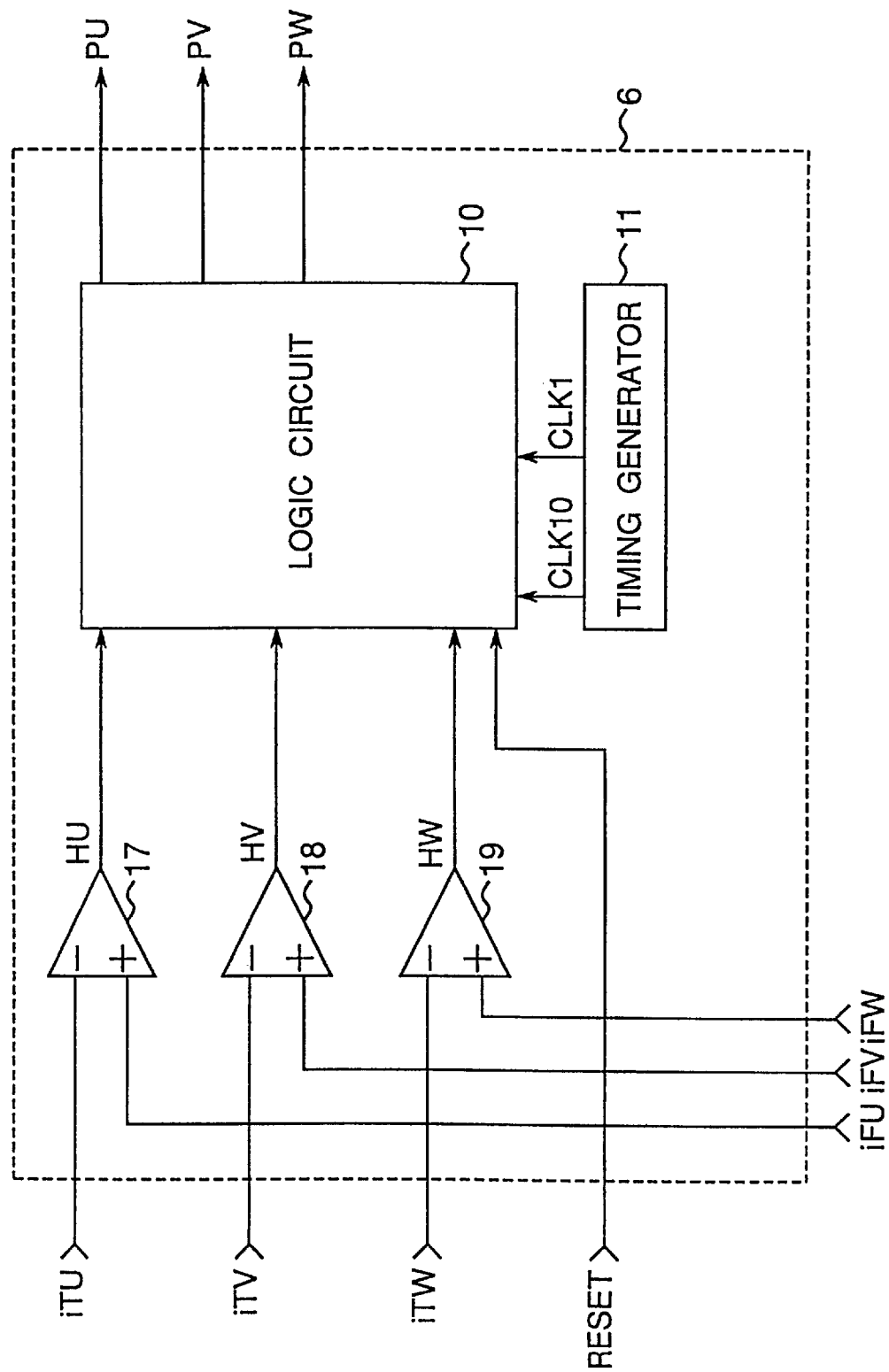
FIG. 2 is a block diagram of a current controller according to the embodiment of FIG. 1.

FIG. 2 shows a schematic construction of the current controller 6 included in the PWM converter according to the first embodiment of the present invention shown in FIG. 1.

In FIG. 2, reference numerals 17, 18 and 19 denote first, second and third comparators which receive the first, second and third line current instructions iTU, iTV and iTW at their respective inverting input terminals and receive the first, second and third line current measurement results iFU, iFV, and iFW at their respective non-inverting input terminals, so that the line current instructions and the line current measurement results are respectively compared with each other, and then the comparators generate first, second and third line current comparison results HU, HV and HW which are applied to a logic circuit 10.

For convenience, in the subsequent description, it is assumed that the line current comparison results HU, HV and HW are H level when the line current measurement results are larger than the values of the line current instructions while the line current comparison results are L level when the line current measurement results are smaller than the values of the line current instructions.

Then, the logic circuit 10 receives the first, second and third line current comparison results HU, HV and HW from the comparators and also receives a state update timing signal CLK10 and a system clock signal CLK1 from a timing signal generator 11 and then output the first, second and third switching instruction signals PU, PV and PW for instructing ON or OFF of the switching power devices Q1, Q2, Q3, Q4, Q5 and Q6.

In this logic circuit 10, first of all, at a timing of a rising edge of the state update timing signal CLK10, the state update is performed in accordance with the level of the first, second and third line current comparison results HU, HV and HW to thereby generate the first, second and third switching instruction signals PU, PV and PW. Then, in response to a change in signal level of the first, second and third line current comparison results HU, HV and HW, the first, second and third switching instruction signals PU, PV and PW are altered.

The truth value table of the logic circuit 10 is shown in FIG. 3 and the way of reading FIG. 3 is described below.

In FIG. 3, State No. (A00, AX1, AX2, A00, AY1, AY2, B00, BX1 . . . CLR) represents the input/output state of the logic circuit 10, where a symbol ○ of the state update timing signal CLKIO represents a timing of a leading edge of the state update timing signal CLK10 while a symbol ♦ represents a stable H level or L level state.

A symbol * of the line current comparison results HU, HV and HW indicates DON'T CARE i.e. that the operation is not affected by whether H level or L level, where H indicates H level and L indicates L level. A reset signal RESET, which is normally L level, is input to the logic circuit 10 for initialization of the logic circuit 10, and when the reset signal is H level, the logic circuit 10 is immediately initialized.

Next, the operation of the logic circuit 10 is described with reference to FIG. 3. First of all, when the state update timing signal CLK10 rises (i.e., when the leading edge is input to the logic circuit 10), the input/output state of the logic circuit 10 transits to one of the eight states: state No. A00, B00, C00, D00, E00, F00, G00, H00, depending on the levels of the first, second and third line current comparison results HU, HV and HW at this point.

Referring to the first place of the state No., there are eight branches A~H, and for convenience in description, the Arabic numerical symbols of the three places of the state No. will be called, from the left, the first place, the second place and the third place.

First, the case will be described when state transition takes place to any one of the states No. A00, B00, C00, D00, E00, F00.

When transition takes place to one of the above six states, looking at two signals having the same signal level among the first, second and third line current comparison results HU, HV and HW at a timing of a rising edge of the state update timing signal CLK10, subsequent operation is different depending on which one of these two signals having the same level is the first to change. That is, looking at the second place of the state No., there are two branches represented by X and Y.

For example, in the case of a state No. A00, if the second line current comparison result HV is the first to change (H to L), a transition takes place to a state No. AX1, and if the third line current comparison result HW is the first to change (H to L), a transition takes place to a state No. AY1. If subsequently, of the first, second and third line current comparison results HU, HV and HW at the timing of the leading edge of the state update timing signal CLK10, the remaining one changes, which was not the first to change, of the two signals of the same signal level, a transition takes place to a state No. which has state 2 in the third place, remaining the first place and second place same as before.

For example, from state No. AX1, transition takes place to state No. AX2, and if the state No. is AY1, transition takes place to state No. AY2. Thereafter, this state is held until the timing of the next rising edge of the state update timing signal CLK10.

Lastly, the transition to state No. G00 or H00 at the timing of the rising edge of the state update timing signal CLK10 will be described. In these cases, this condition is held until the input of the next rising edge of the state update timing signal CLK10 so that the levels of first, second and third switching instruction signals PU, PV and PW continue to be output.

Hereinbelow the operation of the logic circuit 10 is described based on the truth value table shown in FIG. 3.

First of all, the operation at a timing of the rising edge of the state update timing signal CLK10 will be described.

The logic circuit 10 reads the signal levels of the first, second and third line current comparison results HU, HV and HW at the timing of the rising edge of the state update timing signal CLK10 and then determines the signal levels of the switching instructions PU, PV, PW to be output from the logic circuit 10 such that the first, second and third line current measurement results iFU, iFV, and iFW are changed at that time in such a direction as to draw near to the respective first, second and third line current instructions iTU, iTV, and iTW, in other words, such a direction that iFU, iFV, and iFW coincide with the line current instructions iTU, iTV, and iTW. This results in that the signal levels of the switching instructions PU, PV, and PW are respectively those obtained by inverting the line current comparison results HU, HV and HW. For example, if HU is H level, PU is determined to be L level and if HU is L level, PU is determined to be H level. The same applies to PV and PW.

Next, the operation of the logic circuit 10 after a timing of a rising edge of the state update timing signal CLK10 to the next timing of the subsequent rising edge of the state update timing signal CLK10 is described below.

The operation during this period is determined by the levels of the three signals HU, HV and HW at the timing of the rising edge of the state update timing signal CLK10. Referring to the levels of these three signals HU, HV and HW, the description will be made below in terms of the operation in the case where the level of one signal of the three signals is different, namely:

$$(HU, HV, HW) = (L, H, H)$$
$$or = (H, L, H)$$
$$or = (H, H, L)$$
$$or = (H, L, L)$$
$$or = (L, H, L)$$
$$or = (L, L, H)$$

and the operation in the case where all three signals are the same, namely:

$$(HU, HV, HW) = (H, H, H)$$
$$or = (L, L, L)$$

First, the following describes the operation in the case where the level of one signal of the three signals HU, HV and HW at the timing of the rising edge of the state update timing signal CLK10 is different from the other two signal levels.

As described before in connection with the line current measurement results detected by the power source current detector 9, it is self-evident that, in the three line currents of the three-phase AC power source 1, the sum of the value of two line currents out of the three line currents with inverted polarity is equal to the value of the remaining one. In the logic circuit 10 according to the first embodiment of the present invention, in consideration of the two signals having the same level of the three signals HU, HV, and HW at the timing of the rising edge of the state update timing signal CLK10, the levels of the switching instruction signals PU, PV and PW are determined so as to effect ON/OFF control of the switching power devices that supply the line currents in respect of the two signals having the same level.

More specifically, first of all, the level of the switching instruction signal in question is inverted to effect changeover such that, regarding the ON or OFF condition of the switching power device that supplies line current relating to the signal whose level was the first to be inverted of two signals whose levels were the same, if the condition was ON, it becomes OFF, while if OFF it becomes ON. Next, when the level of the remaining signal of the two signals whose levels were the same is inverted, the level of the switching instruction signal in question is inverted to change over the ON or OFF condition of the switching power device that supplies the line current relating to the signal that was likewise inverted.

At this time-point, the three signals: first, second and third switching instruction signals PU, PV and PW which are the outputs of the logic circuit 10 have the same level which is coincident with the level of the one signal different from the level of the other two signals in the three signals HU, HV and HW, at the timing of the rising edge of the state update timing signal CLK10. These signals PU, PV and PW maintain the last resultant level until the next timing of the rising edge of the state update timing signal CLK10. Thus, the same operation is repeated after the timing of the subsequent rising edge of the state update timing signal CLK10.

Next, the operation will be described in the case where the levels of the three signals HU, HV and HW at the timing of the rising edge of the state update timing signal CLK10 are all the same.

In the case where the levels of the three signals HU, HV and HW are all the same, the signal levels of PU, PV and PW that were fixed at the timing of the rising edge of the state update timing signal CLK10 are maintained until the timing of the next rising edge of the state update timing signal CLK10.

The construction of the logic circuit 10 of the first embodiment of the present invention is described in more detail below.

Figure 4:
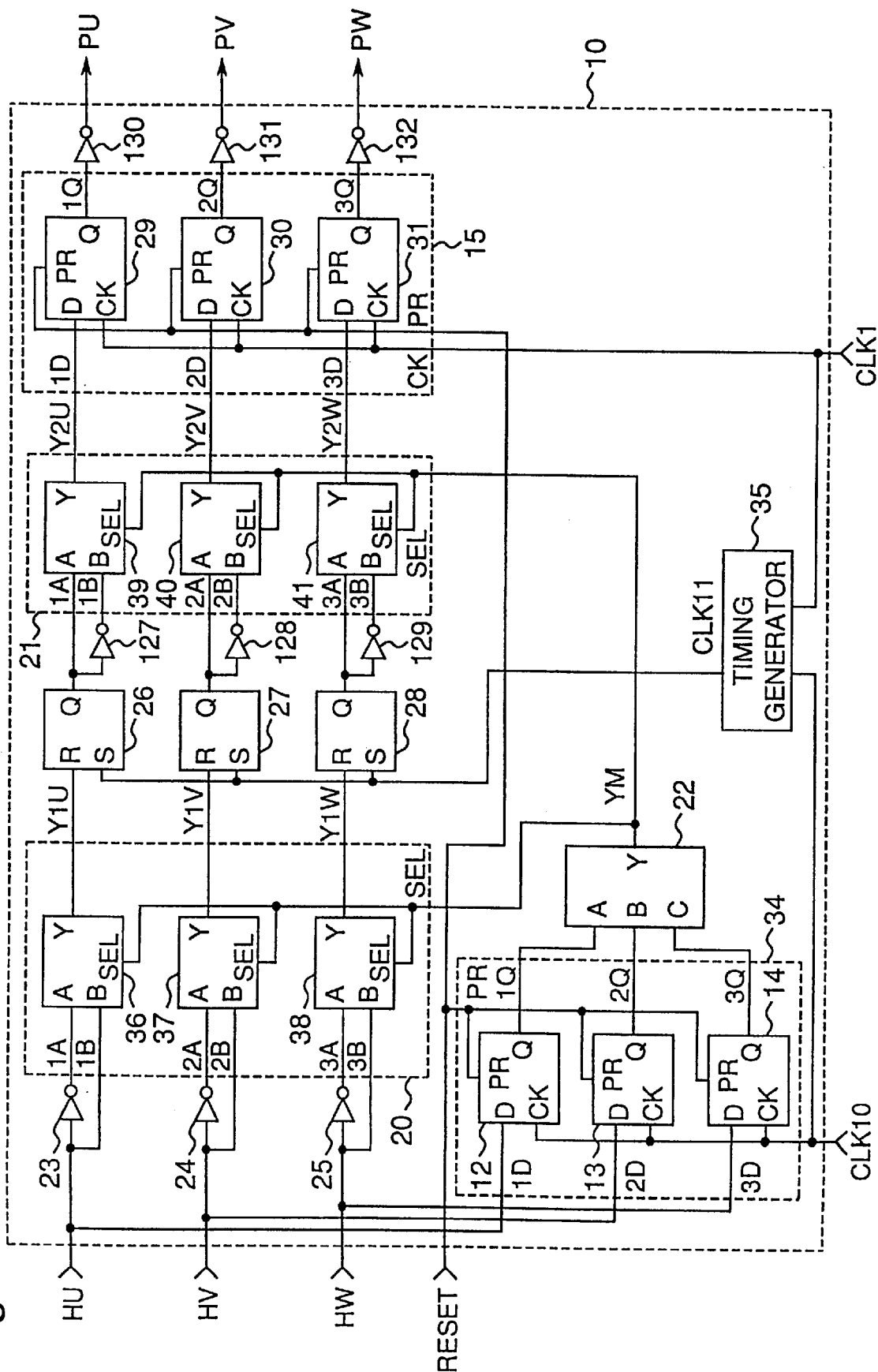
FIG. 4 is a block diagram of a logic circuit of the first embodiment.

The internal construction of the logic circuit 10 is described with reference to FIG. 4, explaining the operation of the structural elements. In FIG. 4, reference numerals 36, 37, 38, 39, 40 and 41 are first, second, third, fourth, fifth and sixth data selectors, having their operation such that when an input terminal SEL is H level, the level of an input terminal B is output at an output terminal Y and when the input terminal SEL is L level, the level of an input terminal A is output at the output terminal Y. In this construction, the first to third data selectors 36 to 38 are included in a first data selecting section 20, while the fourth to sixth data selectors 39 to 41 are included in a second data selecting section 21.

Next, reference numerals 26, 27, and 28 are first, second and third reset-priority RS flip-flops, and when an input terminal R for reset is H level and an input terminal S for set is L level, the signal level of the RS flip-flops is reset and the signal level of an output terminal Q is changed to L level. In the meanwhile, when an input terminal R is L level and input terminal S is H level, the signal level of the RS flip flops is set and the signal level of the output terminal Q is changed to H level. When the input terminal R is H level and input terminal S is also H level, the signal level of each RS flip-flop is reset, reset being prioritized, and the signal level of the output terminal Q is changed to L level.

Next, reference numerals 29, 30, 31, 12, 13, and 14 are first, second, third, fourth, fifth and sixth D-latches, where the first to third D-latches 29 to 31 are included in the second data latch section 15, while the fourth to sixth D-latches 12 to 14 are included in the first data latch section 34, and where each of the D-latches has three input terminals D, CK and PR and one output terminal Q. In this construction, the signal level of the D input terminal is latched at the timing of the rising edge of the clock pulse signal CLK1 or CLK10 input to the input terminal CK and then generates an output signal of this latched level through the output terminal Q. Each input terminal PR is for inputting a preset signal, and if H level is input, namely, when the RESET signal becomes active in the broader stair including the D-latch, the preset signal for the D-latch becomes active so that the D-latch is preset with maximum priority and H level is output through the output terminal Q.

Next, 23, 24, 25, 127, 128, 129, 130, 131 and 132 are first, second, third, fourth, fifth, sixth, seventh, eighth, and ninth inverting gates, and if H level is input at their input terminals, L level is output at their output terminals, and if L level is input at their input terminals, H level is output at their output terminals. Reference numeral 22 is a data decoder unit, having input terminals A, B and C and output terminal Y, and its truth table is shown in Table 1.

It should be noted that the truth table (Table 1) can easily be implemented by AND, OR and inverting gates.

TABLE 1

| INPUT | | | OUTPUT |
|---|---|---|---|
| A | B | C | $Y = A \cdot B \cdot C + \overline{A} \cdot \overline{B} \cdot C + \overline{A} \cdot B \cdot \overline{C} + A \cdot \overline{B} \cdot \overline{C}$ |
| L | L | L | L |
| L | L | H | H |
| L | H | L | H |
| L | H | H | L |
| H | L | L | H |
| H | L | H | L |
| H | H | L | L |
| H | H | H | H |

Reference numeral 35 denotes a timing signal distributing unit which receives the system clock CLK1 and state update timing signal CLK10 and generates a state update timing delay signal CLK11. The relationship of CLK1, CLK10 and CLK11 will now be described with reference to FIG. 5. First of all, it is to be assumed that the period of the state update timing signal CLK10 is considerably larger than the period of the system clock CLK1 and that the update timing signal CLK10 is changed in synchronization with the timing of the trailing edge (e.g., at time 1) of the system clock CLK1. Next, the state update timing delay signal CLK11 is assumed to be a signal obtained by delaying the state update timing signal CLK10 by an amount of half the time interval between the trailing edge and the rising edge (e.g., at time 3) of the system clock CLK1.

In more detail, the operation of the logic circuit 10 is now described below.

The input terminals A of the first, second, and third data selectors 36, 37 and 38 will be respectively referred to as input terminals 1A, 2A and 3A of the first data selecting section 20 while their input terminals B will be respectively referred to as input terminals 1B, 2B and 3B of the first data selecting section 20, while the input terminals SEL being connected in common to constitute the input terminal SEL of the first data selecting section 20.

Also, the input terminals A of the fourth, fifth and sixth data selectors 39, 40, and 41 will be referred to collectively as input terminals 1A, 2A and 3A of the second data selecting section 21 while their input terminals B will be respectively referred to as input terminals 1B, 2B and 3B of the second data selecting section 21, with input terminals SEL being connected in common to constitute the input terminal SEL of the second data selecting section 21.

Also, the input terminals D of the first, second, and third D latches will be referred to respectively as input terminals 1D, 2D and 3D of first data latch section 34, with the input terminals CK being connected in common to constitute input terminal CK of first means 34 for data latching, input terminals PR being connected in common to constitute input terminal PR of the first data latch section 34, with the output terminals Q being respectively referred to as output terminals 1Q, 2Q and 3Q of first data latch section 34. The input terminals D of the fourth, fifth and sixth D latches 29, 30 and 31 will be referred to respectively as input terminals 1D, 2D and 3D of the second data latch section 15, with the input terminals CK being connected in common to constitute input terminal CK of second data latch section 15, with the input terminals PR being connected in common to constitute input terminal PR of the second data latch section 15, with the output terminals Q being respectively referred to as output terminals 1Q, 2Q and 3Q of the second data latch section 15.

Also the outputs of the first data selecting section 20 will be referred to as first selection output signals Y1U, YIV, YIW and the outputs of the second data selecting section 21 will be referred to as second selection output signals Y2U, Y2V, Y2W.

First of all, the first, second and third line current comparison results HU, HV and HW are input to the input terminals 1D, 2D, 3D of the first data latch section 34. At the same time, the first, second and third line current comparison results HU, HV and HW are input to the input terminals 1B, 2B, 3B of the first data selecting section 20 and are also input to the input terminals 1A, 2A, 3A thereof through the first, second and third inverting gates 23, 24, and 25, respectively.

The condition immediately after the state update timing signal CLK10 changes from L level to H level i.e. when the rising edge thereof is input, in other words, TIME 1 in FIG. 5 will be described.

First of all, the input levels of the input terminals 1D, 2D, and 3D of the first data latch section 34 are latched to be held and are output through the output terminals 1Q, 2Q, and 3Q. This condition of the first data latch section 34 is maintained until the next rising edge of the state update timing signal CLK10 is input. Next, the signals output from the output terminals 1Q, 2Q, and 3Q of the first data latch section 34 are input to the data decoder unit 22 and the output terminal Y of the data decoder unit 22 is made H level or L level in accordance with the truth table of Table 1. Hereinbelow, the signal output from this output terminal Y will be referred to as mode signal YM.

In this construction, the mode signal YM is input to the input terminal SEL of the first data selecting section 20 to generate the first selection output signals YIU, YIV, Y1W in accordance with the mode signal YM.

Next, the condition immediately after the state update timing delay signal CLK 11 changes from L level to H level i.e. a rising edge is input; at TIME 2 in FIG. 5 will now be described.

First of all, the state update timing delay signal CLKll is input to the respective input terminals S of the first, second and third RS flip-flops 26, 27 and 28 and these flip-flops are set when the signal CLK11 is H level. However, as described earlier, the first, second and third RS flip-flops 26, 27 and 28 are reset-priority RS flip-flops, so if the input terminal R is H level, reset is prioritized. The result is that, in the first, second and third RS flip-flops 26, 27 and 28, only the flip-flop whose input terminal R is L level is set when the state update timing delay signal CLK11 is H level.

The output signals of the first, second and third RS flip-flops 26, 27 and 28 are input to the input terminals 1A, 2A, 3A of the second data selecting section 21 and are also input to the input terminals 1B, 2B, 3B thereof through the fourth, fifth and sixth inverting gates 127, 128, and 129, respectively. The mode signal YM generated by the data decoder unit 22 is input to the input terminal SEL of the second data selecting section which outputs second selection output signals Y2U, Y2V, Y2W in accordance with the mode signal YM.

Figure 5:
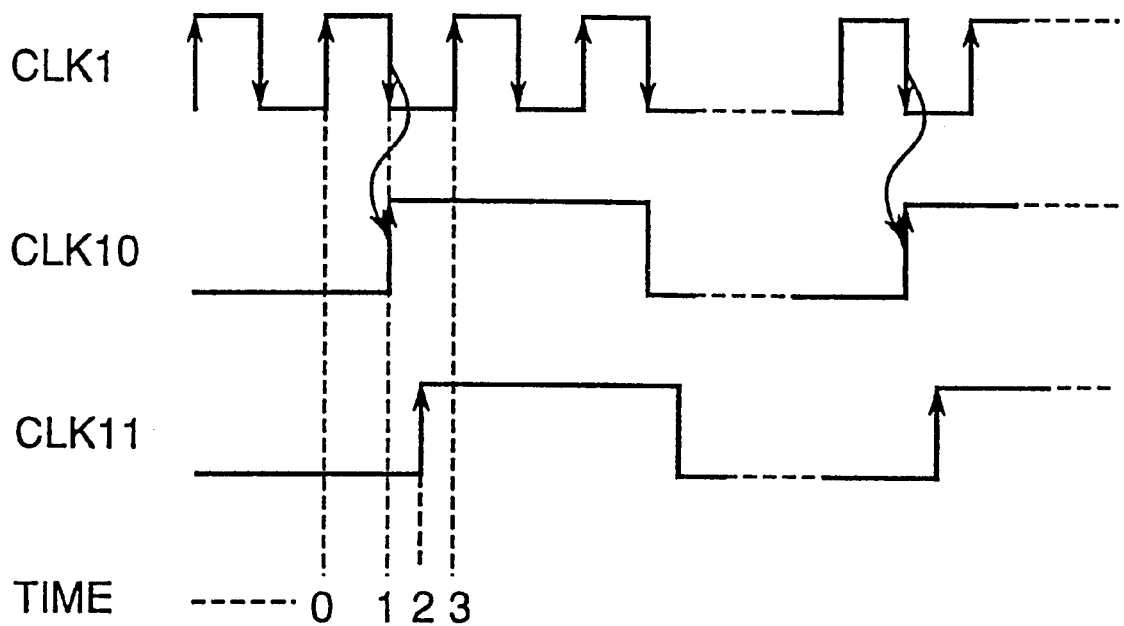
FIG. 5 is a timing chart of a timing signal distributing unit in the logic circuit of FIG. 2.

Next, the following describes the condition immediately after the system clock CLK1 changes from L level to H level, i.e., a rising edge thereof is input to the logic circuit 10 from the timing signal generator 11 at TIME 3 shown in FIG. 5.

First of all, when the rising edge of the system clock CLK1 is input to the input terminal CK of the second data latch section 15, the second data latch section 15 latches the second selection output signals Y2U, Y2V, Y2W input through the input terminals 1D, 2D, and 3D, and outputs the input latched signals through the output terminals 1Q, 2Q, and 3Q of the second data latch section 15, and these output signals are held until the timing of the next rising edge of the state update timing signal CLK10. The output signals from 50 the output terminals 1Q, 2Q, 3Q of the second data latch section 15 are respectively fed to the seventh, eighth and ninth inverting gates 130, 131 and 132 to generate the first, second and third switching instruction signals PU, PV and PW serving as the output signals of the current controller 6.

Since the first, second and third switching instruction signals PU, PV and PW are updated at the timing of inputting the rising edge of system clock CLK1 to the input terminal CK of the second data latch section 15, these switching instruction signals are not changed at TIME 1 or TIME 2 in FIG. 5.

The above description is of the operations from the time-point (TIME1) at which the state update timing signal CLK10 changes from L level to H level to the time-point (TIME2) at which the state update timing delay signal CLK11 changes from L level to H level and to the time-point (TIME3) at which the subsequent system clock CLK1 changes from L level to H level. These operations are of the transition to the eight states: State No. A00, B00, C00, D00, E00, F00, G00, H00 in FIG. 3, which are the operations at the timing of the rise (i.e., input of the rising edge) of the state update timing signal CLK10.

Next, the subsequent operation i.e. operation up to the time point of the next rising edge of the state update timing signal CLK10 is input will be described.

First of all, the following describes the case where a transition takes place to any one of State No. A00, B00, C00, D00, E00, F00 in FIG. 3, in other words, the case where there are two signals of the same signal level of the first, second and third line current comparison results HU, HV and HW at the timing of the rising edge of the state update timing signal CLK10. The description will be herein given taking as an example of the state A00 of FIG. 3.

In the condition of State No. A00, the line current comparison result HU is L level, HV is H level, HW is H level as shown in FIG. 3, and the mode signal YM is L level, the outputs of first means 20 for data selection: Y1U is H level, Y1V is L level, Y1W is L level, the first RS flip-flop 26 is in the reset condition, second RS flip-flop 27 is in the set condition, and third RS flip-flop 28 is in the set condition. Also, the outputs of the second data selecting section 21: Y2U is L level, Y2V is H level, and Y2W is H level.

The following describes the operation when the second line current comparison result HV changes from H to L level, i.e., the operation when a transition takes place from State No. A00 to State NO. AX1.

When the second line current comparison result HV changes from H to L level, the level of the first selection output signal Y1V is changed over from L level to H level and thereby second RS flip-flop 27 is reset, which causes the second selection output signal Y2V to be changed over from H to L level. Consequently, PU, PV and PW become (PU, PV, PW)=(H, H, L) at the timing of inputting the next rising edge of the system clock CLK1. In the next-stage, the main circuit power control section 8 operates in accordance with these first, second and third switching instruction signals PU, PV and PW output from the current controller 6.

Thereafter, the following describes the operation when the third line current comparison result HW changes from H to L level i.e. the operation in which a transition takes place from State No. AX1 to State No. AX2 in FIG. 3.

When the third line current comparison result HW changes from H to L level, the level of the first selection output signal Y1W is changed over from L level to H level and then the third RS flip-flop 28 is thereby reset, causing the second selection output signal Y2W to change over from H level to L level.

PU, PV and PW therefore become (PU, PV, PW)=(H, H, H) at the timing of inputting the next rising edge of the system clock CLK1. The next-stage power control section 8 is operated in accordance with the first, second and third switching instruction signals PU, PV and PW.

This condition i.e. (PU, PV, PW)=(H, H, H) is maintained until the timing of the rising edge of the system clock CLK1 after the timing of the next rising edge of the state update timing signal CLK10.

The foregoing was a description of the operation in the case where a transition took place to one of State No. A00, B00, C00, D00, E00, F00 at the timing of the rising edge of the state update timing signal CLK10 i.e. the case where there were two signals with the same signal level of the first, second and third line current comparison results HU, HV and HW at the timing of the rising edge of the state update timing signal CLK10. However, the case will now be described where a transition next takes place to any one of State No. G00, H00 in FIG. 3, i.e. the case where all of the first, second and third line current comparison results HU, HV and HW at the timing of the rising edge of state update timing signal CLK10 have the same signal level.

The following describes an operation taking as an example of the condition of State No. G00 in FIG. 3. In the condition of State No. G00, the line current comparison result HU is H level, HV is H level, HW is H level, mode signal YM is H level, the output of the first data selecting section 20 Y1U is H level, Y1V is H level, Y1W is H level, and the first, second and third RS flip-flops 26, 27 and 28 are all in the reset condition.

As a result, the output of the second data selecting section 21: Y2U is H level, Y2V is H level, Y2W is H level, so, regarding PU, PV and PW, at the timing of the next rising edge of the system clock CLK1, PU becomes L level, PV becomes L level and PW becomes L level, and thus the next-stage power control section 8 is operated in accordance with the resultant PU, PV and PW.

This condition (PU, PV, PW)=(L, L, L) is maintained until the timing of the rising edge of the system clock CLK1 after the timing of the next rising edge of the state update timing signal CLK10.

The above is a description of the operation in the transition from State No. A00 to State No. AX1 and then to State No. AX2 and of the transition to State No. G00 at the timing of the rising edge of the state update timing signal CLK10. In this connection, the other state transitions in FIG. 3 can be inferred in the same way from the above description, so explanation thereof is omitted.

The following describes an operation and way of controlling the line currents of the three-phase AC power source 1 in the case where the line current instructions are sine wave signals with reference to FIGS. 6A to 6C.

FIG. 6A shows the first, second and third line current instructions iTU, iTV, and iTW and the first, second and third line current measurement results iFU, iFV, and iFW; FIG. 6B shows the action of the logic circuit 10 regarding a dotted line portion of FIG. 6A shown to a larger scale; and FIG. 6C shows the ON/OFF action of the first, second, third, fourth, fifth and sixth switching power devices Q1, Q2, Q3, Q4, Q5 and Q6 in response to the output levels of the first, second and third switching instruction signals PU, PV and PW generated by the logic circuit 10.

First of all, the operation of the PWM converter at time-point t=t1 i.e. at the timing of the rising edge of the state update timing signal CLK10 will be described.

At time t=t1, the magnitude relationships of iTU, iTV, iTW and iFU, iFV, iFW at the timing of the rising edge of state update timing signal CLK10 are as below:

iTU>iFU
iTV<iFV
iTW<iFW and the first, second and third line current comparison results HU, HV and HW are (HU, HV, HW)=(L, H, H).

This condition corresponds to State No. A00 in the truth table of FIG. 3 and the switching instruction signals PU, PV and PW output from the logic circuit 10 become (PU, PV, PW)=(H, L, L) and these signals are transmitted to the main circuit control section 8. Thus, the switching power devices Q1, Q2, Q3, Q4, Q5 and Q6 are respectively turned OFF, ON, ON, ON, OFF, OFF and line current measurement results iFU, iFV, and iFW approach the line current instructions iTU, iTV, and iTW in accordance with the electric time constant of the three-phase AC power source 1.

Next, the operation will be described when iTV>iFV, at the timing (t=t11) of changing the condition of the line current comparison results from (HU, HV, HW)=(L, H, H) to (HU, HV, HW)=(*, L, H).

Since the level of HU is ignored, so, for convenience in description, HU=* is taken to mean DON'T CARE. Hereinbelow '*' is taken to mean DON'T CARE. The logic circuit 10 receives the first, second and third line current comparison results HU, HV and HW, and changes over the output first, second and third switching instruction signals PU, PV and PW from the condition (PU, PV, PW)=(H, L, L) to the condition (PU, PV, PW)=(H, H, L), changes the switching power device Q2 to OFF and Q5 to ON, which corresponds to the transition from State No. A00 to State No. AX1).

Next, the operation will be described when iTW>iFW, at the timing (t=t12) of changing the condition of the line current comparison results from (HU, HV, HW)=(*, L, H) to (HU, HV, HW)=(*, L, L).

The logic circuit 10 receives the first, second and third line current comparison results HU, HV and HW, and changes over the signal level conditions of the first, second and third switching instruction signals PU, PV and PW from (PU, PV, PW)=(H, H, L) to (PU, PV, PW)=(H, H, H), and then changes the switching power device Q3 to OFF and Q6 to ON, which corresponds to the transition from State No. AX1 to State No. AX2.

The condition of (PU, PV, PW)=(H, H, H) obtained at time-point t=t12is then maintained until the timing of the next rising edge of the state update timing signal CLK10.

Likewise, by performing the same operation after the next timing of the rising edge of the state update timing signal CLK10, the line currents of the three-phase AC power source 1 are controlled such as to conform to the first, second and third line current instructions iTU, iTV, and iTW.

It should be noted that, in FIG. 1, in the base drive circuit 4 for controlling the main circuit switching power devices Q1, Q2, Q3, Q4, Q5 and Q6 in accordance with the output levels of PU, PV and PW output from the current controller 6, a construction may be employed such that there is a fast change from ON to OFF and a fixed time delay is applied when the respective switching power devices Q1, Q2, Q3, Q4, Q5 and Q6 change from OFF to ON. In this construction, for example, when changing from a condition in which Q1 is ON and Q4 is OFF to a condition in which Q1 is OFF and Q4 is ON, first of all Q1 is turned OFF and after Q1 has definitely completed OFF, Q4 is turned ON. By this arrangement, it is possible to avoid the risk that, at the timing where Q1 and Q4 change over, they may be instantaneously simultaneously ON to cause a large current to flow to the switching power devices.

Figure 7:
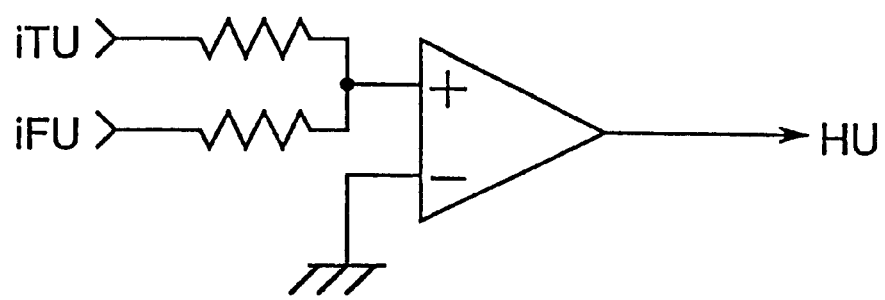
FIG. 7 is a circuit diagram showing a construction is of a comparator unit shown in FIG. 2.

Also, while in the comparators 17 to 19 in FIG. 2, the line current instruction is input to the inverting input terminal and the line current measurement result is input to the non-inverting terminal, another construction of comparator means can be of course employed as shown in FIG. 7, where a line current instruction of inverse phase with respect to the line current to be input is input to the comparator means.

Also, although, in FIG. 1, the power source current detector 9 is provided between the three-phase AC power source 1 and the reactor 59, it could of course be provided between the reactor 59 and the main circuit power control section 8.

Also, in cases such as where current cut off is performed as protection on overload of the PWM converter, it would of course be possible to add in the base drive section 4 a function of making a condition that all of Q1~Q6 can be put into OFF condition for cutting off the current.

The same operation can of course be performed in power regeneration.

With the first embodiment of the present invention as described above, the construction has no current error amplifier provided, so the problems involved in gain adjustment of a current error amplifier can be essentially solved and no gain adjustment at all is necessary.

Furthermore, even if there are changes in the characteristics and specification of reactor 59, power source current detector 9, current controller 6, or main circuit power control section 8, operation is always such as to make the line current errors the minimum, and even in the presence of manufacturing variation of performance and temperature characteristics etc., operation is always such as to make the line current errors the minimum, so current control response is excellent and there is no risk of oscillation. Also, even if the value of the DC voltage changes, there is no need to adjust the gain and operation is performed such that the line current error is always minimum. Also, apart from first, second and third comparators, the current controller 6 in a PWM converter according to the present invention can be constructed entirely of digital circuitry, and therefore the portion that is constructed of simple digital circuitry has no risk of offset or drift and is of low cost, desirably.

Furthermore, as the first line current instruction, second line current instruction and third line current instruction respectively, by employing an in-phase sine wave signal or inverse-phase sine wave signal with respect to the respective phase voltages seen from the neutral point of the three-phase AC power source 1, reduction of the phase difference between the phase voltages and line currents, in other words, improvement of the power factor, can be achieved, and since the control can be performed such that the line currents are sine waves, distortion of the line currents can be suppressed, in other words, higher harmonics of the power source can be reduced.

Consequently, with the present invention, there can be provided a PWM converter wherein the task of adjustment of the gain of the current error amplifiers and/or the task of offset adjustment are unnecessary yet which has excellent current control response.

(Embodiment 2)

Figure 8:
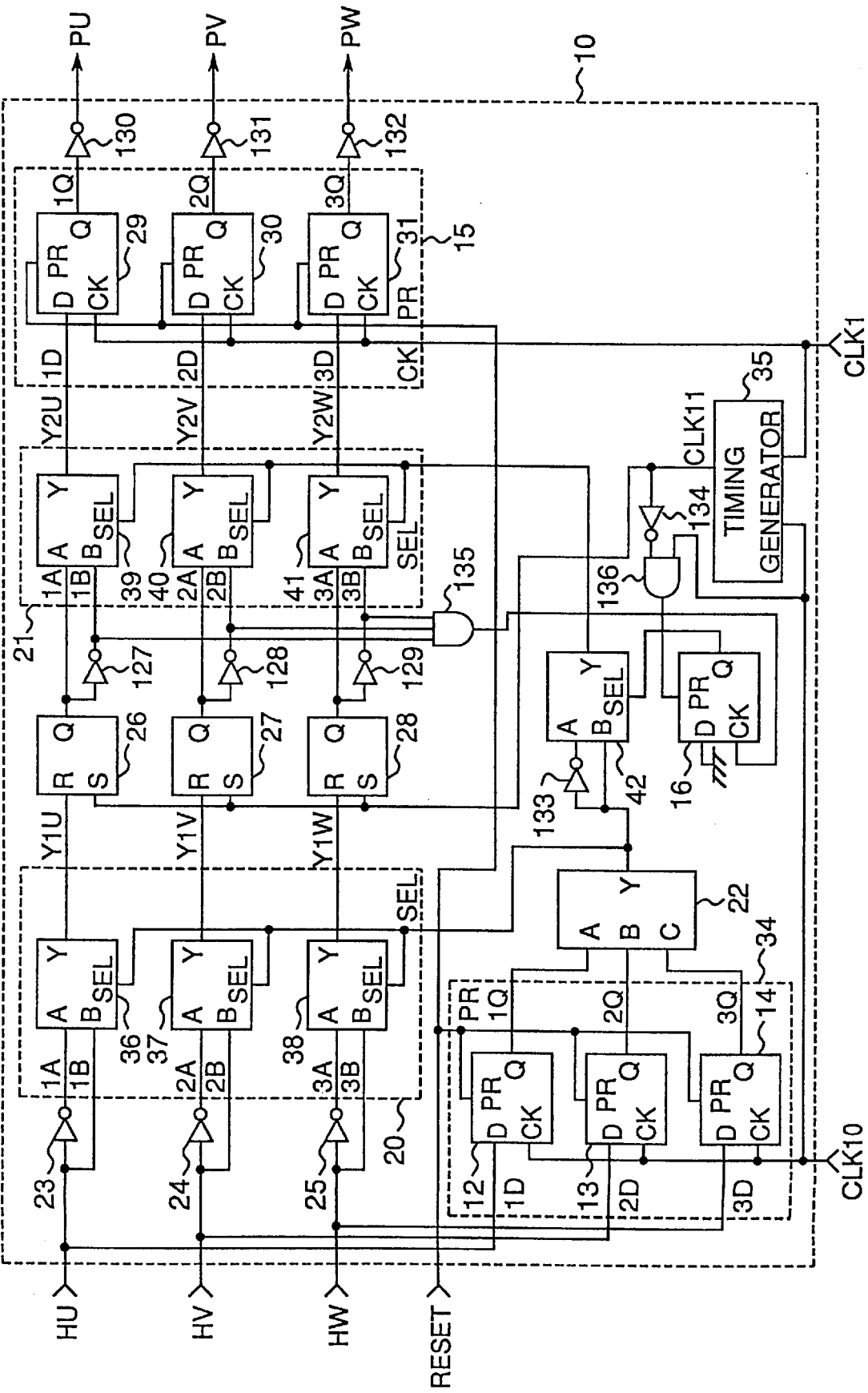
FIG. 8 is a block diagram of a logic circuit according to a second embodiment of the present invention.

The following describes a second embodiment of a PWM converter according to the present invention with reference to FIGS. 8 and 9. In the second embodiment, FIG. 8 shows a construction of a logic circuit 10 provided in the current controller 6, where the internal structure of the logic circuit is different from that of the first embodiment shown in FIG. 4. The rest of the construction of the PWM converter of the second embodiment is exactly the same as that of the first embodiment, so the detailed description thereof is omitted here. Hereinbelow, the description will be concerned with the construction of the logic circuit 10 and its operation in the second embodiment.

Before the description of the logic circuit 10 proceeds, it is noted that, since the way of reading the truth table of the logic circuit 10 shown in FIG. 9 is exactly the same as that of the first embodiment, so the description thereof is omitted here.

Also, the operation of the logic circuit 10 based on the truth table shown in FIG. 9 is generally the same as that of the logic circuit 10 of the first embodiment, so the description thereof is likewise omitted here.

The logic circuit 10 reads the first, second and third line current comparison results HU, HV and HW at the timing of the rising edge of the state update timing signal CLK10 and determines the signal levels of the switching instruction signals PU, PV and PW in accordance with the comparison results HU, HV and HW, which the operation in this regard is exactly the same as that of the logic circuit 10 described in the first embodiment.

Next, regarding the operation of the logic circuit 10 up to the timing of the next rising edge of the state update timing signal CLK10, in a similar manner to the operation of the logic circuit 10 in the first embodiment, the operation is described in the two cases, i.e, in the first case where one of the signal levels of the three signals HU, HV, HW is different from the level of the other two signals, namely:

$$(HU, HV, HW) = (L, H, H)$$
$$\text{or} = (H, L, H)$$
$$\text{or} = (H, H, L)$$
$$\text{or} = (H, L, L)$$
$$\text{or} = (L, H, L)$$
$$\text{or} = (L, L, H)$$

and in the second case where all three signals are in the same level, namely:

$$(HU, HV, HW) = (H, H, H)$$
$$\text{or} = (L, L, L).$$

First, the following describes the operation in the case where the level of one signal is different from the other two signals of the three signals HU, HV and HW at the timing of the rising edge of the state update timing signal CLK10.

First, the level of the switching instruction signal in question is inverted to effect changeover such that if the ON or OFF condition of a switching power device that supplies line current relating to the one signal of the two signals having the same levels of which level was the first to be inverted was ON, it becomes OFF while if it was OFF, it becomes ON. This is exactly the same as the operation of the logic circuit 10 in the first embodiment. Subsequently, however, the operation differs from that of the first embodiment in that, when the level of the remaining signal of the two signals having the same levels is inverted, the ON/OFF of the switching power device that supplies line current relating to the signal having its level inverted is not changed over but instead the level of the other two switching instruction signals is again inverted.

At this time-point, the three signals PU, PV, and PW of the switching instruction signals constituting the output of the logic circuit 10 have the same level, but these three signals PU, PV, and PW maintain their level until the timing of the next rising edge of the state update timing signal CLK10, where these three signals PU, PV, and PW have levels which are the inverse of that of the one signal of which the level was different at the timing of the rising edge of the state update timing signal CLK10. The relationship of the signal levels is mutually inverted from those of the first embodiment. The same operation is repeated after the timing of the next rising edge of the state update timing signal CLK10.

Next, in the case where the levels of the three signals HU, HV and HW are all the same at the timing of the rising edge of the state update timing signal CLK10, the operation is the same as that of the first embodiment and the description thereof is omitted here.

The construction of the logic circuit 10 provided in the current controller 6 according to the second embodiment is described in more detail below.

Regarding the internal construction of the logic circuit 10, parts which are different from the first embodiment will be described with reference to FIG. 8. First of all, the operation of the structural elements that are newly provided with respect to the logic circuit 10 of the first embodiment will be described below.

Reference numerals 135 and 136 denote first and second AND circuits and when H level signals are input to all of the input terminals of the three input terminals of the first AND circuit 135, H level is output at the output terminal. Also, when H level signals are input to all of the two input terminals of the second AND circuit 136, H level is output at the output terminal. If at least one of the input terminals is L level, L level is output at the output terminal in the first and second AND circuits.

Besides these elements, there are newly provided a seventh selector 42, a seventh D latch 16, and tenth and eleventh inverting gates 133 and 134. However, the operation of these structural elements is exactly the same as in the first embodiment, so the description of their operation is omitted here.

In the arrangement of these structural elements, the output terminal Y of the data decoding unit 22 is connected through the tenth inverting gate 133 to an input terminal A and is directly connected to another input terminal B of the seventh data selector 42. The output terminal Y of the seventh data selector 42 is connected to the input terminal SEL of the second data selecting section 21 while the input terminal SEL of the seventh data selector 42 is connected to the output terminal Q of the seventh D latch 16. An input terminal D of the seventh D latch 16 is earthed to be always L level and another input terminal CK is connected with the output terminal of the first AND circuit 135 and further input terminal PR of the seventh D latch 16 is connected to the output terminal of the second AND circuit 136.

The output terminals Q of the first, second and third RS flip-flops 26, 27 and 28 are respectively connected through the fourth, fifth and sixth inverting gates 127, 128, and 129 to the three input terminals of the first AND circuit 135. The state update timing delay signal CLK11 is input to one of the two input terminals of the second AND circuit 136 through the eleventh inverting gate 134, while the state update timing signal CLK10 is input to the other input terminal of the second AND circuit 136.

By this arrangement, in the seventh data selector 42, when the seventh D latch 16 is pre-set with its output terminal Q being H level to be input to the input terminal SEL of the seventh data selector 42, the signal level input to the input terminal B is output at the output terminal Y. When the input terminal CK of the seventh D latch 16 is changed over from L level to H level, the output terminal Q becomes L level which is input to the input terminal SEL of the seventh data selector 42, resulting in that the level input at input terminal A of the seventh data selector 42 is output at the output terminal Y.

In this arrangement, the occasion for the presetting of the seventh D latch 16 is when the state update timing delay signal CLK11 is L level and the state update timing signal CLK10 is H level. Meanwhile, the occasion for the changeover of the input terminal CK from L level to H level is when the first, second and third RS flip-flops 26, 27 and 28 are all pre-set.

The operation of the logic circuit 10 constructed as above will now be described.

In view of FIG. 5, in the duration prior to the rising edge of the state update timing delay signal CLK11, since the state update timing signal CLK10 is H level and the state update timing delay signal CLK11 is L level, the seventh D latch 16 is pre-set, and therefore a signal of the same level as that of the mode signal YM output from the data decoding unit 22 is input to the common input terminal SEL of the second data selecting section 21.

In contrast, the level at the input terminal SEL of the second data selecting section 21 cannot be inverted until all of the first, second and third RS flip-flops 26, 27 and 28 are in the reset condition.

Consequently, when a transition takes place to any one of State Nos. A00, B00, C00, D00, E00, F00 shown in FIG. 9, i.e., in the case where there are two signals of the same signal level in the first, second and third line current comparison results HU, HV and HW at the timing of the rising edge of the state update timing signal CLK10, the operation of transition from the levels of PU, PV and PW which were fixed at the timing of the rising edge of the state update timing signal CLK10 up to the transition of the operation where any one of the three signals PU, PV and PW is first inverted in level is exactly the same as in the first embodiment. Subsequently, when the remaining one of HU, HV, HW is inverted, all the first, second and third RS flip-flops 26, 27 and 28 are reset, so that the level of the input terminal SEL of the second data selecting section 21 is inverted as shown by State No. AX2, AY2, BX2, BY2 etc. of FIG. 9, which the levels are the inverse of those shown in FIG. 3 in the first embodiment.

The levels resulting from the changeover is maintained until the timing of the rising edge of the system clock CLK1 subsequent to the timing of the rising edge of the next state update timing signal CLK10, which the operation is the same as in the first embodiment.

Next, the following describes the case where a transition takes place to any one of State Nos. G00, H00 in FIG. 9, i.e., the case where all of the first, second and third line current comparison results HU, HV and HW at the timing of the rising edge of the state update timing signal CLK10 were the same level.

In view of FIG. 5, at the timing of the rising edge of the state update timing signal CLK10, the first, second and third RS flip-flops 26, 27 and 28 are all reset. In this duration, the seventh D latch 16 is in the pre-set condition up to the timing of the rising edge of the state update timing delay signal CLK1, and the level of the input terminal SEL of the second data selecting section 21 is unchanged, so the operation in this case is exactly the same as the operation of the first embodiment, as shown in FIG. 9.

As described above, in the operation of the logic circuit 10 according to the second embodiment of the present invention, when comparing the first embodiment of FIG. 3 and the second embodiment of FIG. 9, the only difference is that, in this second embodiment, only when the level of one signal of the three signals HU, HV and HW, is different at the timing of the rising edge of the state update timing signal CLK10, the signal levels of PU, PV and PW whose levels are mutually equal as the result of the final transition of the operation, are the inverse of the levels of PU, PV and PW in the first embodiment.

Regarding the levels of PU, PV and PW, when the switching instruction signals PU, PV and PW are mutually the same, the inter-line voltages of the respective lines of the three-phase AC power source 1 become zero. Therefore, whether PU, PV, PW are H, H, H or L, L, L in level, there is no change in the inter-line voltages of the respective lines up to the timing of the next rising edge of the state update timing signal CLK10. In the second embodiment, therefore, the line currents of the three-phase AC power source 1 can be controlled in exactly equivalent fashion to the first embodiment. It should be noted that a modified arrangement of FIG. 9 would be possible where PU, PV and PW at State No. G00 are H, H, H and PU, PV and PW at State No. H00 are L, L, L.

(Embodiment 3)

Figure 10:
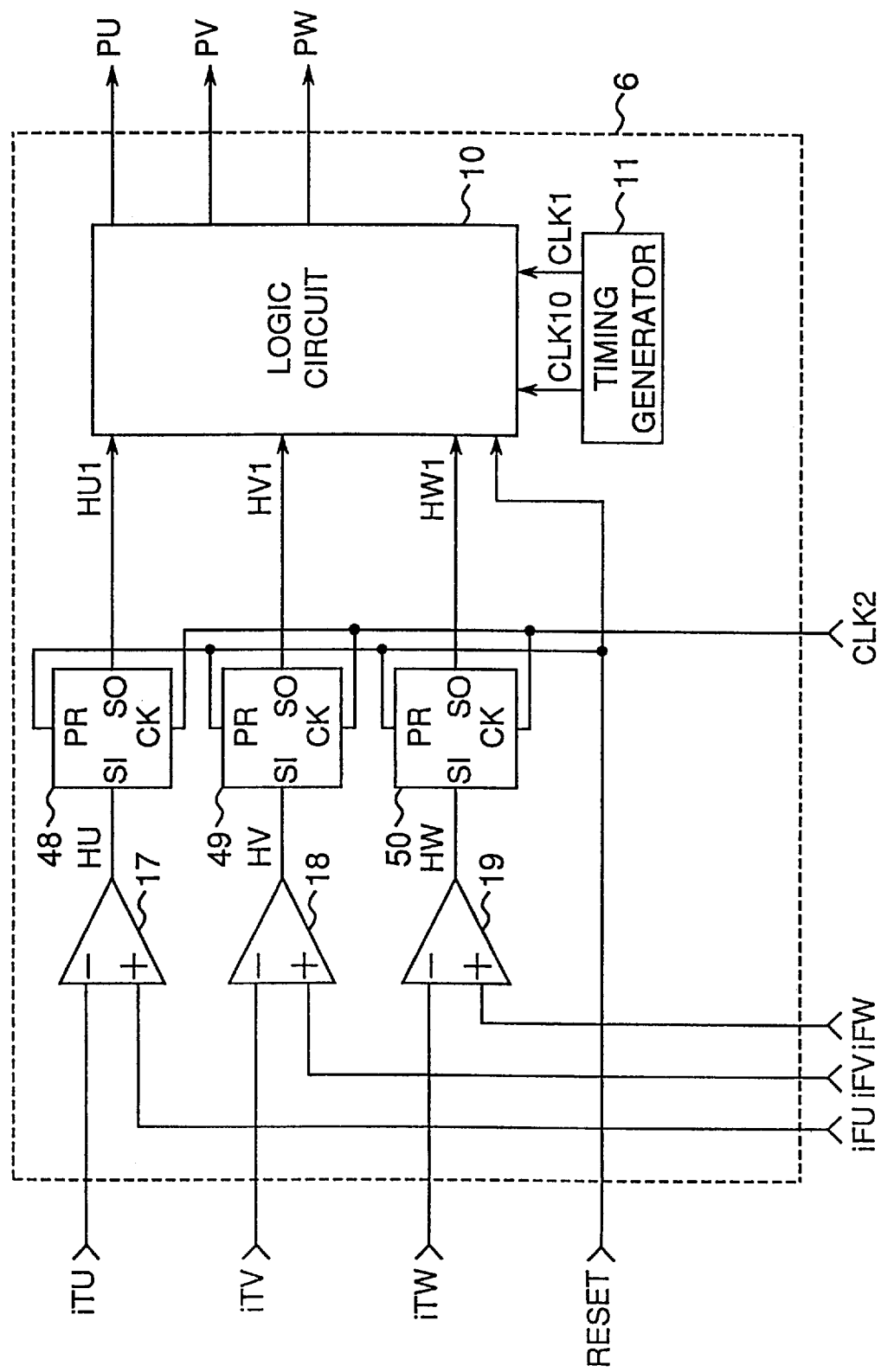
FIG. 10 is a block diagram of a current controller according to a third embodiment of the present invention.

In the third embodiment of the present invention, as shown in FIG. 10, the internal structure of the current controller 6 provided in the PWM converter is different from that of the first embodiment or the second embodiment shown in FIG. 2. The remaining of the third embodiment of the present invention is the same as the first embodiment or second embodiment except for the fact that, as the structural elements of the current controller 6 as shown in FIG. 10, there are newly provided first, second and third double-reading logic circuits 48, 49 and 50 interconnected between the comparators 17 to 19 and the logic circuit 10.

The first, second and third double-reading logic circuits 48, 49, and 50 respectively have exactly the same construction, so the construction and operation of the first double-reading logic circuit 48 will be described below using a typical double-reading logic circuit shown in FIG. 11.

Figure 11:
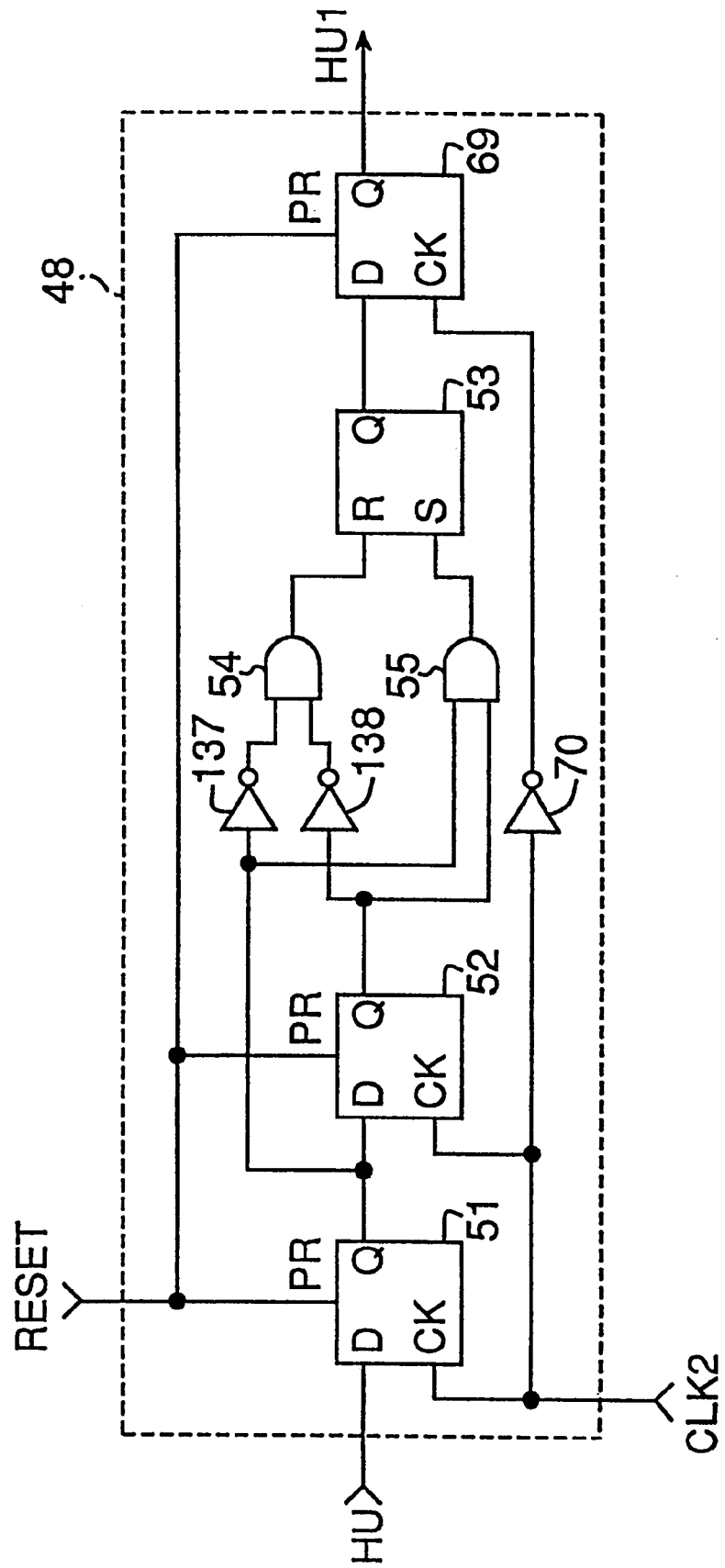
FIG. 11 is a block diagram showing a construction of a double-reading logic circuit of FIG. 10.

In FIG. 11, reference numerals 51, 52 and 69 denote eighth, ninth and tenth D-latches each having three input terminals PR, D and CK and an output terminal Q. In this construction, the level of the input terminal D is latched at the timing of the rising edge of the signal input to the input terminal CK receiving a system clock pulse CLK2 and the latched level at the input terminal D is output through the output terminal Q. The input terminal PR is for receiving a pre-set signal, and when H level is input to the input terminal PR, the D latch is preset with priority and the signal level at the output terminal Q becomes H level. Also, the input terminals CK of the eighth, ninth and tenth D latches 51, 52 and 69 are connected in common while the input terminals PR of the eight, ninth and tenth D latches 51, 52, and 69 are connected in common receiving RESET signal for preset.

Reference numerals 137, 138 and 70 denote twelfth, thirteenth, and fourteenth inverting gates, and when H level is input at their input terminals, they output L level at their output terminals and vice versa. Reference numeral 53 denotes a fourth RS flip-flop, and when the input terminal R is H level and input terminal S is L level, it is reset to change the condition of the output terminal Q to L level, and when the input terminal R is L level and input terminal S is H level, it is set to change the condition of the output terminal Q to H level. Reference numerals 54 and 55 denote third and fourth AND circuits, and when all their input terminals are fed with H level signals, they output H level output signal, and for otherwise inputs, they output L level output signal.

The following describes the operation of the first double-reading logic circuit 48 in more detail with reference to the signal flow.

In the first stage, the level of the first line current comparison result HU input to the input terminal SI of the first double-reading logic circuit 48 is latched and held in the eighth D latch 51 at the timing of the rising edge of the system clock CLK2 and the latched level is output at the output terminal Q.

At the timing of the next rising edge of the system clock CLK2, the level of the output terminal Q of the eighth D latch 51 is latched and held in the ninth D latch 52 and is output at its output terminal Q while the level of the comparison result HU at this time is latched and held in the eighth D latch 51 and is output at its output terminal Q.

The output levels of the output terminals Q of the eighth and ninth D latches 51 and 52 are respectively fed to fourth AND circuit 55 and are also transmitted through the twelfth and thirteenth inverting gates 137, 138 to the third AND circuit 54. Then the output of the third AND circuit 54 is fed to the input terminal R of the fourth RS flip-flop 53 and the output of the fourth AND circuit 55 is fed to the input terminal S of the fourth RS flip-flop 53. The level of the output terminal Q of the fourth RS flip-flop 53 is then latched by the tenth D latch 69 at the timing of the trailing edge of the system clock CLK2.

In this construction, the system clock CLK2 is logically inverted by means of the fourteenth inverting gate 70 and the resultant inverted signal is fed to the input terminal CK of the tenth D latch 69. Therefore, the input signal level at the input terminal D of the tenth D latch 69 is latched at the timing of the trailing edge of the system clock CLK2. The output terminal Q of the tenth D latch 69 then generates a signal HU1 as the output signal of the first double-reading logic circuit 48.

From the above operation, it can be seen that the first double-reading logic circuit 48 performs an operation of checking the input signal HU at every timing of the rising edge of CLK2, and if the checking result continues to be H level twice, the output signal HU1 is altered to H level, and if the checking result continues to be L level twice, the output signal HU1 is altered to L level.

The above is a description of the internal operation of the first double-reading logic circuit 48 and this is exactly the same for the second and third double-reading logic circuits 49 and 50.

The first, second and third double-reading logic circuits 48, 49, and 50 therefore make it possible to generate the output signals HU1, HV1, HW1 from which signal fluctuation due to very short-period noise contained in the signals HU, HV, HW, i.e., H level→L level→H level or L level→H level→L level, has been removed.

It should be noted that, in FIG. 11, by providing three or more D latches and taking the AND of the output levels of the D latches, it would be possible to set the number of times of reading the timing of the rising edge of the system clock CLK2 to three or more.

With the third embodiment of the present invention as described above, by adopting a construction where the first, second and third double-reading logic circuits 48, 49, and 50 are provided and respective output signals HU, HV, HW of the first, second and third comparator units 17, 18 and 19 in the current controller are transmitted to the logic circuit 10 through the first, second and third double-reading logic circuits 48, 49, and 50 respectively, the noise superimposed on the output signals of the first, second and third comparator units 17, 18 and 19 can be removed. Thus, the line currents of three-phase AC power source 1 can be controlled to coincide accurately with the first, second and third line current instructions iTU, iTV, and iTW even under conditions where noise is likely to be generated.

It should be noted that the same benefit will of course be obtained whether the first, second and third double-reading logic circuits 48, 49, and 50 of the present embodiment are added to the first embodiment or the second embodiment.

(Embodiment 4)

Figure 12:
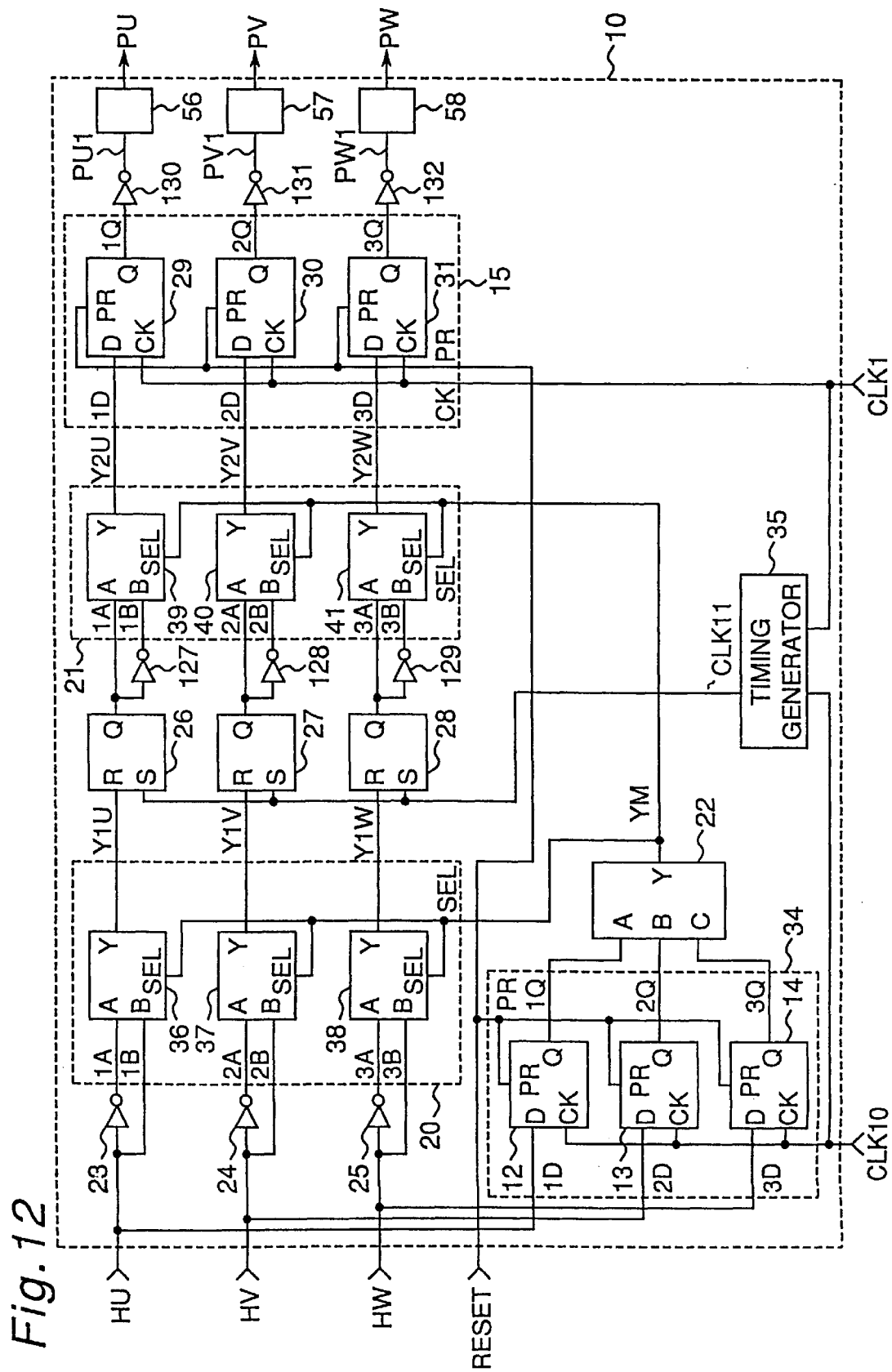
FIG. 12 is a block diagram of a logic circuit according to a fourth embodiment of the present invention.
Figure 14:
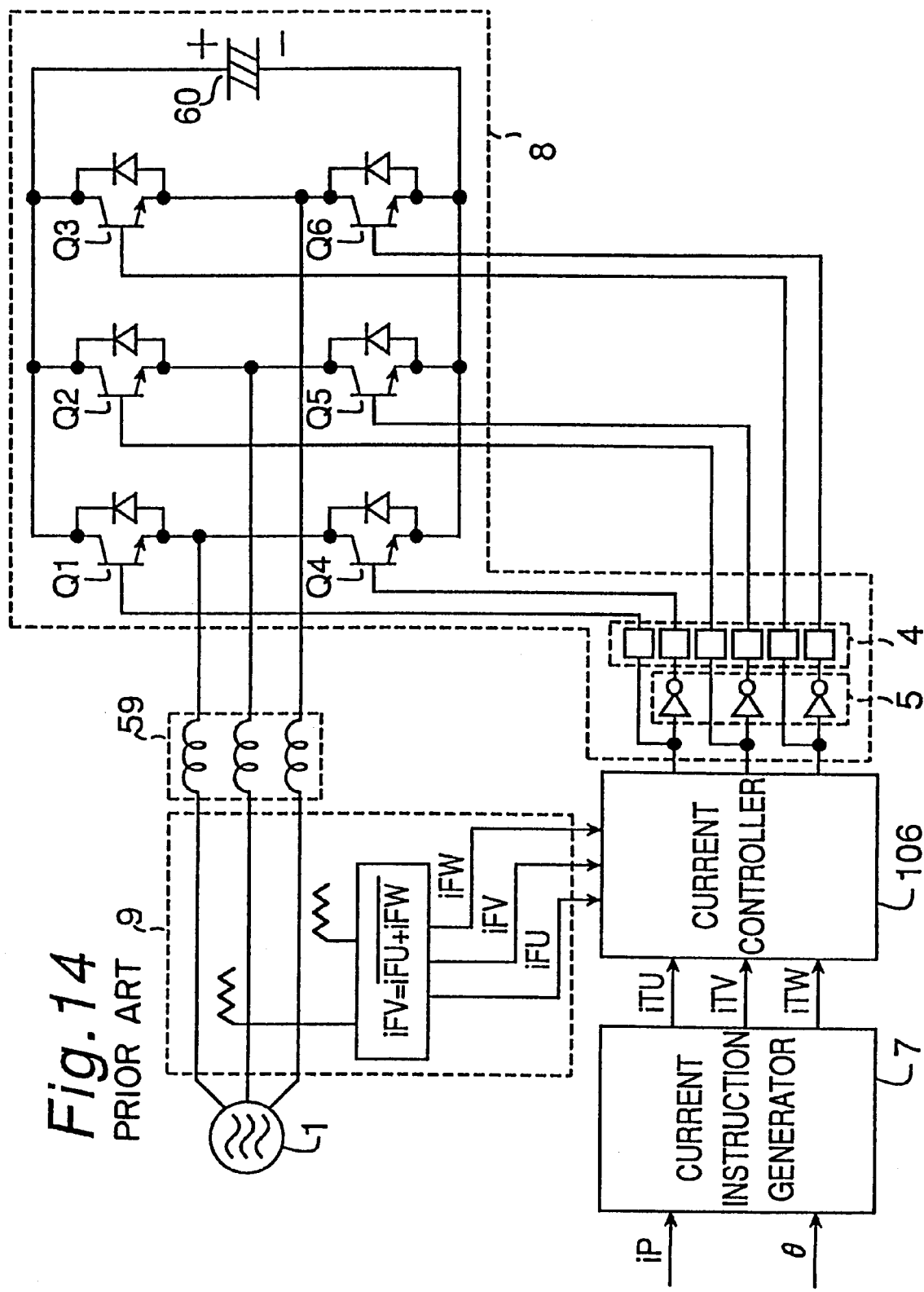
FIG. 14 is a block diagram of a typical conventional PWM converter.
Figure 15:
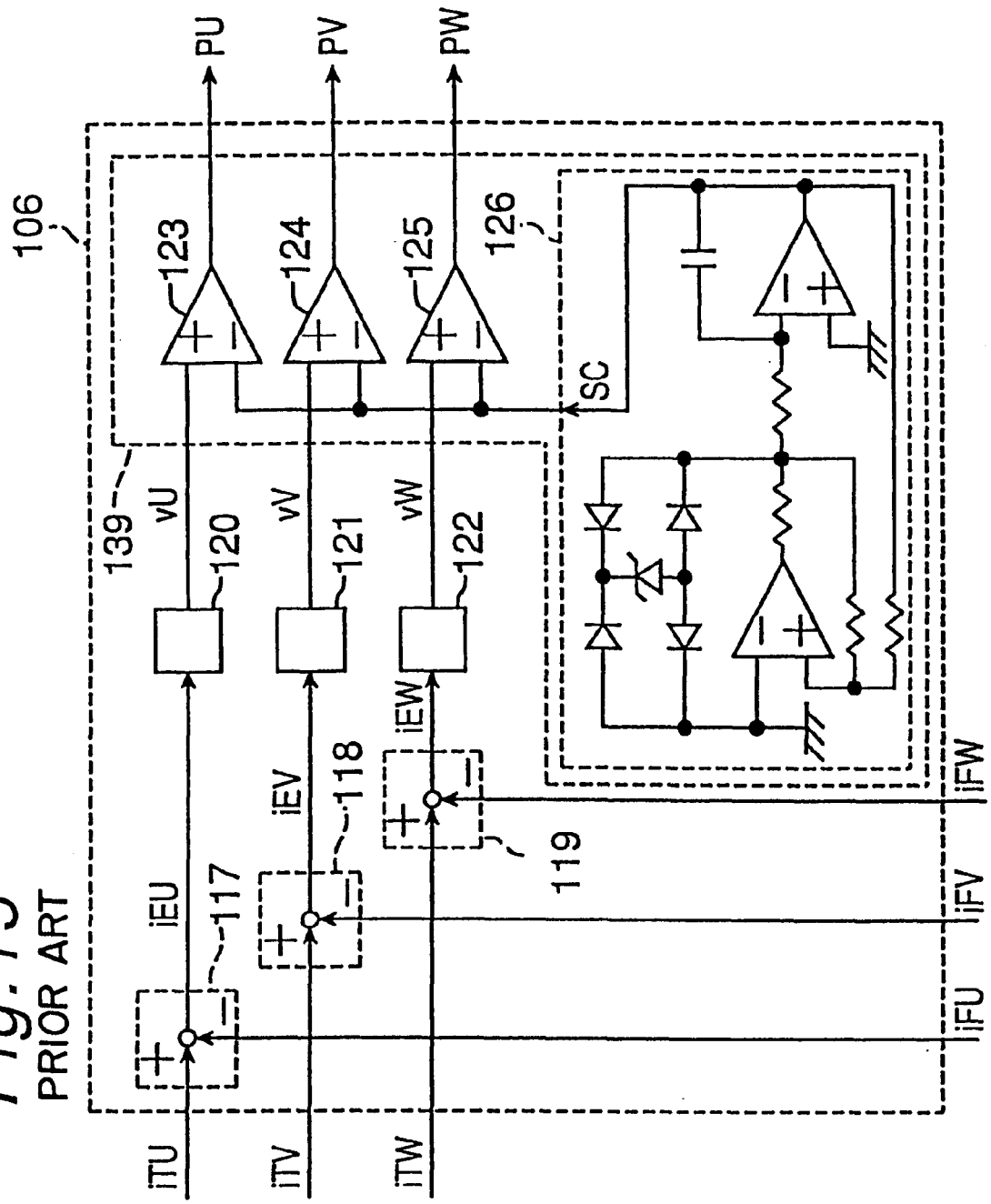
FIG. 15 is a block diagram of a conventional current controller of FIG. 14.
Figure 16A:
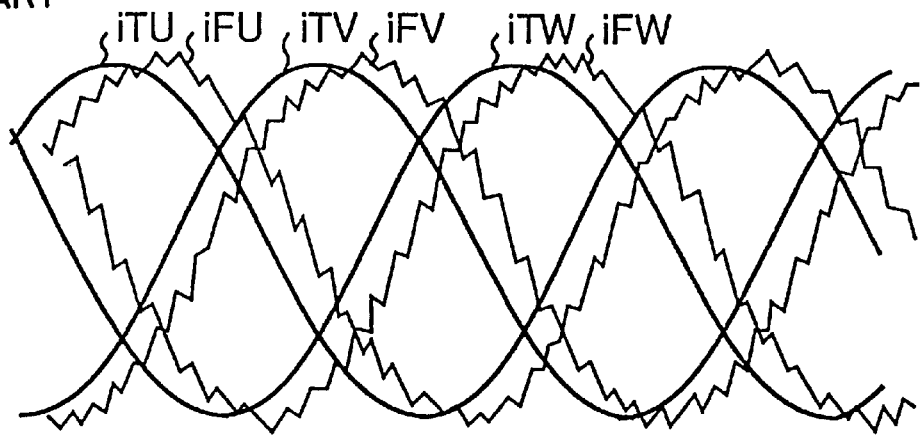
FIGS. 16A, 16B, 16C, 16D and 16E are timing charts showing the operation of the conventional current controller.
Figure 16B:
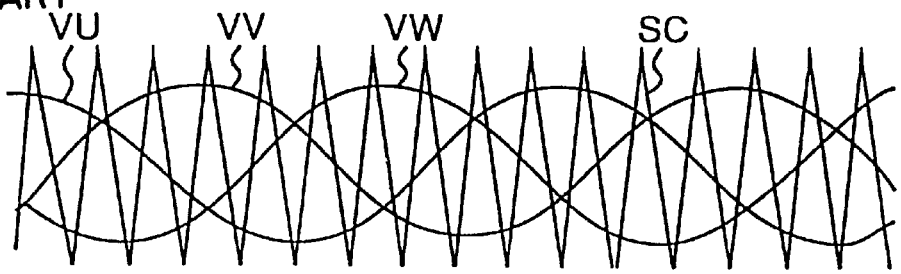
Figure 16C:
Figure 16D:
Figure 16E:
Figure 17:
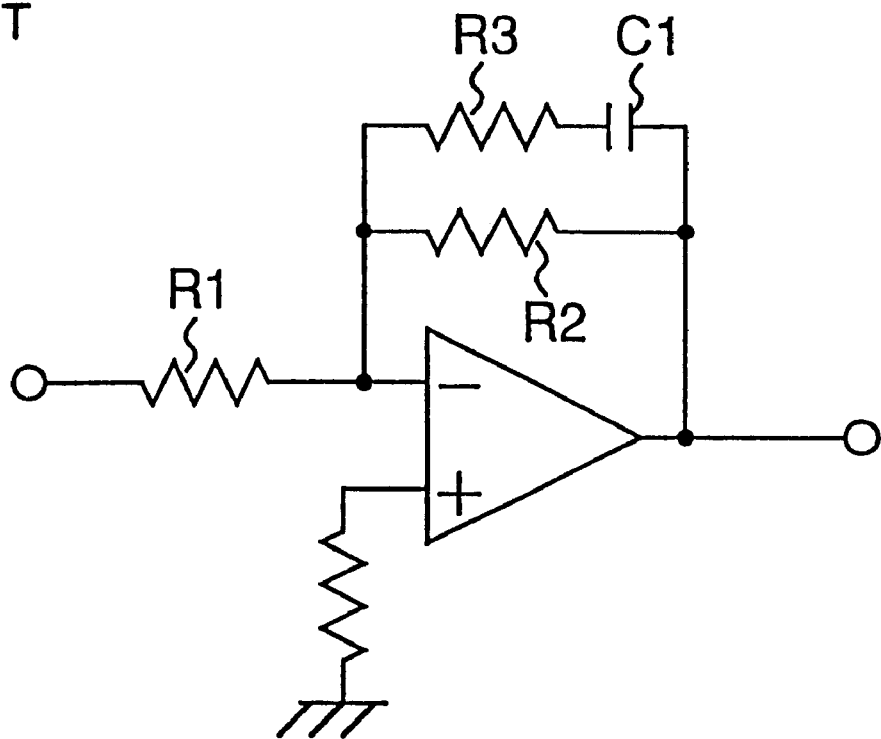
FIG. 17 is a circuit diagram of a conventional current error amplifier.

FIG. 12 shows an internal construction of a logic circuit 10 provided in a current controller 6 of the PWM converter according to a fourth embodiment of the present invention.

Comparing the internal construction of the logic circuit 10 shown in FIG. 12 of the fourth embodiment with that of the first embodiment shown in FIG. 4, the constructions are generally the same except for the fact that, a construction is adopted where the output signals PU1, PV1, PW1 of the seventh, eighth and ninth inverting gates 130, 131 and 132 are input to first, second and third delay units 56, 57 and 58 for delaying switching instruction signals, which the output signals are transmitted to the main circuit power control section 8 as the first, second and third switching instruction signals PU, PV and PW.

The following describes the operation of the first, second and third delay units 56, 57 and 58 for delaying the switching instruction signals.

The first, second and third delay units 56, 57 and 58 for delaying the switching instruction signals are so constructed as to respectively receive the output signals PU1, PV1, PW1 output from the seventh, eighth and ninth inverting gates 130, 131 and 132 and delay these signals PU1, PV1, PW1 by predetermined times in accordance with a predetermined rule and then transmit the delayed signals to the main circuit power control section 8 as the first, second and third switching instruction signals PU, PV and PW. Specifically, the construction is such that, in FIG. 3 and FIG. 9, the delay time is 0 only when shifting to State Nos. A00, B00, C00, D00, E00, F00, C00, H00, but when shifting to other states, the first, second and third switching instruction signals PU, PV and PW delayed by a predetermined time are output from the delay units 56, 57 and 58.

The following describes the operation of a current-control type PWM converter according to the fourth embodiment controlling the line currents of a three-phase AC power source 1 with reference to FIG. 3 and FIGS. 13A–13C.

FIG. 13A shows the first, second and third line current instructions iTU, iTV, and iTW and first, second and third line current measurement results iFU, iFV, and iFW. FIG. 13B shows the action of the logic circuit 10 provided with the first, second and third delay units 56, 57 and 58 for delaying the switching instruction signals in connection with the dotted-line section of FIG. 13A to a larger scale. FIG. 13C shows the ON/OFF operation of the switching power devices Q1, Q2, Q3, Q4, Q5 and Q6 based on the output levels of the first, second and third switching instruction signals PU, PV and PW, which are the outputs of the first, second and third delay units 56, 57 and 58.

First of all, the operation at time-point t=t1 i.e. at the timing of the rising edge of the state update timing signal CLK10 will be described.

At time-point t=t1, where the magnitude relationship of iTU, iTV, iTW and iFU, iFV, iFW at the timing of the rising edge of the state update timing signal CLK10 is:

iTU>iFU
iTV<iFV
iTW<iFW the first, second and third line current comparison results HU, HV and HW are (HU, HV, HW)=(L, H, H).

This condition corresponds to State No. A00 in the truth table of FIG. 3 as represented by (HU, HV, HW)=(L, H, H), and therefore the levels of PU1, PV1, PW1 become (PU1, PV1, PW1)=(H, L, L).

At this point, the first, second and third delay units 56, 57 and 58 generate the changes of the signal level of PU1, PV1, PW1 as the output PU, PV, PW which are supplied to the main circuit power control section 8.

Accordingly, the switching power devices Q1, Q2, Q3, Q4, Q5 and Q6 are respectively turned OFF, ON, ON, ON, OFF, OFF, and then the first, second and third line current measurement results iFU, iFV, and iFW approach nearly equal to the first, second and third line current instructions iTU, iTV, and iTW in accordance with the electrical time constant of the three-phase AC power source 1. The above is a description of the operation of transition to State No. A00 at the timing of the rising edge of the state update timing signal CLK10 at time-point t=t1.

Next, the operation is described where the relationship becomes iTV>iFV at the timing when a change takes place from (HU, HV, HW)=(L, H, H) to (HU, HV, HW)=(*, L, H) at a time-point t=t11.

The logic circuit 10 receives these signals HU, HV, HW and changes over the level condition of PU1, PV1, PW1 from (PU1, PV1, PW1)=(H, L, L) to (PU1, PV1, PW1)=(H, H, L). In this operation, at the time-point t=t111 after the lapse of a pre-set delay time TD from the changeover of PV1 from L level to H level, the second delay unit 57 changes over from (PU, PV, PW)=(H, L, L) to (PU, PV, PW)=(H, H, L) so that the switching power device Q2 is changed over to OFF while the switching power device Q5 is changed over to ON.

By this operation, a drop of the second line current measurement result iFV is effected after a fixed time has passed relative to the second line current instruction iTV (shift to State No. AX1).

Next, the operation is described where the relationship becomes iTW>iFW at the time-point t=t12 when a change takes place from (HU, HV, HW)=(*, L, H) to (HU, HV, HW)=(*, L, L).

The logic circuit 10 receives these signals HU, HV, HW and changes over the level condition of PU1, PV1, PW1 from (PU1, PV1, PW1)=(H, H, L) to (PU1, PV1, PW1)=(H, H, H). In this operation, at the time-point t=t112 after the lapse of a pre-set delay time TD from the changeover of PW1 from L level to H level, the third delay unit 58 changes over the output signal condition from (PU, PV, PW)=(H, H, L) to (PU, PV, PW)=(H, H, H) and then the switching power device Q3 is changed over to OFF while the switching power device Q6 is changed over to ON.

By this operation, a drop of the third line current measurement result iFW is suppressed after a fixed time has passed relative to the second line current instruction iTW, which represents the shift to State No. AX2.

The above is a description of the operation at time-point t=t12. The condition (PU, PV, PW)=(H, H, H) is maintained until the timing of the next rising edge of the state update timing signal CLK10.

By repeating the subsequent same operations after the timing of the next rising edge of the state update timing signal CLK10, the line currents of the three-phase AC power source 1 are controlled so as to follow the first, second and third line current instructions iTU, iTV, and iTW.

The above is a description of how the line currents of three-phase AC power source 1 are controlled with the current-control PWM invertor of the fourth embodiment of the present invention.

As above, with the fourth embodiment of the present invention, a construction is adopted such that the logic circuit is provided with the first, second and third delay units for delaying a switching signal and the output from the seventh, eighth and ninth inverting gates is transmitted to the main circuit power control section through the first, second and third delay units. By this arrangement, in the first, second and third delay units, the delay time is made 0 only when shifting to State No. A00, B00, C00, D00, E00, F00, G00, H00 in FIG. 3 and FIG. 9, otherwise when shifting to other states, the first, second and third switching instruction signals PU, PV and PW are transmitted to the main circuit power control section 8 with a predetermined time delay.

By this arrangement, the line currents of the three-phase AC power source 1 can be made to coincide very closely with the line current instructions.

It should be noted that although the present embodiment is made by adding the first, second and third delay units 56, 57 and 58 for delaying switching instruction signals to the first embodiment, the same benefit could of course be obtained by adding the first, second and third delay units 56, 57 and 58 to the second embodiment.

As is clear from the above embodiments, according to the first aspect of the present invention, current error amplifiers are omitted, so that the problems associated with gain adjustment of current error amplifiers are essentially solved and no gain adjustment at all is required.

Furthermore, operation is such that even if the characteristics and specification of the reactors, power source current detector, current controller or main circuit power control section change, the line current errors are always kept to the minimum and operation is also such that even if there is manufacturing variation of the characteristics or temperature characteristics etc. the line current errors are always kept to the minimum, and therefore excellent current control response can be provided and there is no risk of oscillation.

Also, even if the DC voltage changes, there is no need to adjust the gain and operation is always performed to keep the line current errors to be minimum.

Also, apart from the first, second and third comparators, the current controller in a PWM converter according to the present invention can be constructed entirely of simple digital circuitry, and the portion constructed of digital circuitry has no risk of offset or drift and is of low cost.

The present invention can therefore provide a PWM converter in which an operation to adjust the gain of the current error amplifiers and/or an operation to adjust the offset are unnecessary, which has excellent current control response, and which is of low cost.

As described above, according to the fourth aspect of the present invention, noise superimposed on the output signals of the first, second and third comparison means can be removed and spurious operation due to noise can be prevented even under conditions that are subject to noise generation and the line currents of the three-phase AC power source can be controlled to coincide accurately with the first, second and third line current instructions.

Also, if, as set out in the fifth aspect of the invention, the logic circuit has a construction such that the switching instruction signal of whether the first, second, third, fourth, fifth or sixth switching power device respectively is turned to the ON condition or OFF condition is determined at the state update timing and the timing at which the first, second and third line current comparison results change and that comprises delay means so that output switching instruction signals of the first, second, third, fourth, fifth and sixth main circuit switching power devices are delayed by a predetermined time at the timing of changing the first, second and third line current comparison results, the line currents of the three-phase AC power source can be made to coincide very closely with the line current instructions.

Also, as set forth in the sixth aspect of the present invention, the current instruction generator has a construction that outputs a first line current instruction, a second line current instruction and a third line current instruction consisting respectively of a sine wave that is in-phase or a sine wave that is in anti-phase with respect to each phase voltage, seen from the neutral point of the three-phase ac power source, a reduction in phase difference between the phase voltages and the line currents i.e. improvement in the power factor can be achieved and since each line current can be controlled to a sine wave, distortion of the line currents can be suppressed i.e. higher harmonics of the power source can be reduced.

What is claimed is:

1. A PWM converter in a three phase bridge configuration comprising:

a power source current detector (9) for detecting first, second and third line currents (IU, IV, IW) of a three-phase AC power source (1) and generating first, second and third line current measurement results (iFU, iFV, iFW);

a current instructing generator (7) for generating first, second and third line current instruction values (iTU, iTV, iTW);

a main circuit controller (6) which includes first, second and third comparators (17, 18, 19) comparing the first, second and third line current measurement results with the first, second and third line current instruction values respectively to output first, second and third line current comparison results (HU, HV, HW), and a logic circuit (10) generating first, second and third switching instruction signals (PU, PV, PW) based on the first, second and third line current comparison results to switch the switching power means (Q1–Q6) on and off in a manner such that the first, second and third line current measurement results coincide as closely with the first, second and third line current instruction values, respectively.

2. The PWM converter as claimed in claim 1, wherein said first, second and third comparators (17, 18, 19) output the line current comparison results of a first level when the first, second and third line current measurement results are larger than the first, second and third line current instruction values, respectively, and output the line current comparison results of a second level when the first, second and third line current measurement results are smaller than the first, second and third line current instruction values, respectively, and wherein said switching power means is comprised of first, second, third, fourth, fifth and sixth switching power devices (Q1, Q2, Q3, Q4, Q5, Q6), so that the logic circuit determines the levels of the switching instruction signals for putting the first, second, third, fourth, fifth and sixth switching power devices in the on and off conditions, respectively.

3. The PWM converter as claimed in claim 2, wherein said logic circuit is adapted to determine the switching instruction signals such that, at said state update timing, when the first line current comparison result (HU) is of a first level (iFU>iTU) and he second line current comparison result (HV) is of a second level (iFV<iTV) and the third line current comparison result (HW) is of a second level (iFW<iTW), the second, third and fourth switching power devices are switched to the of condition while the first, fifth and sixth switching power devices are switched to the on condition, and then in the subsequent period from the time-point where the second line current comparison result (HV) becomes of a first level up to a time-point of the next state update timing, the fifth switching power device is switched to the off condition while the second switnching power device is switched to the on condition, and then in the subsequent period from the time-point where third line current comparison result (HW) becomes of a first level up to a time-point of the next state update timing, the sixth switching power device is switched to the off condition while the third switching power device is switched to the on condition; and at said state update timing, when the first line current comparison result (HU) is of a second level (iFU<iTU) and the second line current comparison result (HV) is of a first level (iFV>iTV) and the third line current comparison result (HW) is of a second level (iFW<iTW), the first, third and fifth switching power devices are switched to the off condition while the second, fourth and sixth switching power devices are switched to the on condition, and then in the subsequent period from the time-point where the first line current comparison result (HU) becomes of a first level up to a time-point of the next state update timing, the fourth switching power device is switched to the off condition while the first switching power device is switched to the on condition, and then in the subsequent period from the time-point where the third line current comparison result (HW) becomes of a first level up to a time-point of the next state update timing, the sixth switching power device is switched to the off condition while the third swithing power device is switched to the on condition; and at said state update timing, when the first line current comparison result (HU) is of a second level (iFU<iTU) and the second line current comparison result (HV) is of a second level (iFV<iTV) and the third line current comparison result (HW) is of a first level (iFW>iTW), the first, second and sixth switching power devices are switched to the off condition while the third, fourth and fifth switching power devices are switched to the on condition, and then in the subsequent period from the time point where the first line current comparison result becomes of a first level up to a time-point of the next state update timing, the fourth switching power device is switched to the off condition while the first switching power device is switched to the on condition, and then in the subsequent period from the time-point where the second line current comparison result (HV) becomes of a first level up to a time-point of the next state update timing, the fifth switching power device is switched to the off condition while the second switching power device is switched to the on condition; and at said state update timing, when the first line current comparison result (HU) is of a second level (iFU<iTU) and the second line current comparison result (HV) is of a first level (iFV>iTV) and the third line current comparison result is of a first level (iFW>iTW), the first, fifth and sixth switching power devices are switched to the off condition while the second, third and fourth switching power devices are switched to the on condition, and then in the subsequent period from the time-point where the second line current comparison result (HV) becomes of a second level up to a time-point of the next state update timing, the second switching power device is switched to the off condition while the fifth switching power device is switched to the on condition, and then in the subsequent period from the time-point where the third line current comparison result (HW) becomes of a second level up to a time-point of the next state update timing, the third switching power device is switched to the off condition while the sixth switching power device is switched to the on condition; and at said state update timing, when the first line current comparison result (HU) is of a first level (iFU>iTU) and the second line current comparison result (HV) is of a second level (iFV<iTV) and the third line current comparison result (HW) is of a first level (iFW>iTW), the second, fourth and sixth switching power devices are switched to the off condition while the first, third and fifth switching power devices are switched to the on condition, and then in the subsequent period from the time-point where the first line current comparison result (HU) becomes of a second level up to a time-point of the next state update timing, the first switching power device is switched to the off condition while the fourth switching power device is switched to the on condition, and then in the subsequent period from the time-point where the third line current comparison result (HW) becomes of a second level up to a time-point of the next state update timing, the third switching power device is switched to the off condition while the sixth switching power device is switched to the on condition; and at said state update timing when the first line current comparison result (HU) is of a first level (iFU>iTU) and the second line current comparison result (HV) is of a first level (iFV>iTV) and the third line current comparison result (HW) is of a second level (iFW<iTW), the third, fourth and fifth switching power devices are switched to the off condition while the first, second and sixth switching power devices are switched to the on condition, and then In the subsequent period from the time-point where the first line current comparison result (HU) becomes of a second level up to a time-point of the next state update timing, the first switching power device is switched to the of condition while the fourth switching power device is switched to the on condition, and then in the subsequent period from, the time-point where the second line current comparison result (HV) becomes of a second level up to a time-point of the next state update timing, the second switching power device is switched to the off condition while the fifth switching power device is switched to the on condition.

4. The PWM converter as claimed in claim 2, wherein said logic circuit is adapted to determine the switching instruction signals such that, at said state update timing, when the first line current comparison result (HU) is of a first level (iFU>TU) and the second line current comparison result (HV) is of a second level (iFV<iTV) and the third line current comparison result (HW) is of a second level (iFW<iTW), the second, third and fourth switching power devices are switched to the off condition while the first, fifth and sixth switching power devices are switched to the on condition, and when the second line current comparison result (HV) becomes of a first level prior to the third line current comparison result (HW), the fifth switching power device is switched to the off condition while the second switching power device is switched to the on condition which the conditions remain up to a time-point where the third line current comparison result (HW) becomes of a first level, and then in the subsequent period from the time-point where the third line current comparison result (HW) becomes of a first level up to a time-point of the next state update timing, the first, second and third switching power devices are switched to the off condition while the fourth, fifth and sixth switching power devices are switched to the on condition, whereas when the third line current comparison result (HW) becomes of a first level prior to the second line current comparison result (HV), the sixth switching power device is switched to the of condition while the third switching power device is switched to the on condition which the conditions remains up to a time-point where the second line current comparison result (HV) becomes of a first level, and then in the subsequent period from the time-point where the second line current comparison result (HV) becomes of a first level up to a time-point of the next state update timing, the first, second and third switching power devices are switched to the off condition while the fourth, fifth and sixth switching power devices are switched to the on condition; and at said state update timing, when the first line current comparison result (HU) is of a second level (iFU<iTU) and the second line current comparison result (HV) is of a first level (iFV>iTV) and the third line current comparison result (HW) is of a second level (iFW<iTW), the first, third and fifth switching power devices are switched to the off condition while the second, fourth and sixth switching power devices are switched to the on condition, and when the third line current comparison result (HV) becomes of a first level prior to the first line current comparison result (HU), the sixth switching power device is switched to the off condition while the third switching power device is switched to the on condition which the conditions remain up to a time-point where the first line current comparison result (HU) becomes of a first level, and then in the subsequent period from the time-point where the first line current comparison result (HU) becomes of a first level up to a time-point of the next state update timing, the first, second and third switching power devices are switched to the off condition while the fourth, fifth and sixth switching power devices are switched to the on condition, whereas when the first line current comparison result (HU) becomes of a first level prior to the third line current comparison result (HW), the fourth switching power device is switched to the on condition while the first switching power device is switched to the on condition which the conditions remain up to a time-point where the third line current comparison result (HW) becomes of a first level, and then in the subsequent period from the time-point where the third line current comparison result (HW) becomes of a first level up to a time-point of the next state update timing, the first, second and third switching power devices are switched to the off condition while the fourth, fifth and sixth switching power devices are switched to the on condition; and at said state update timing, when the first line current comparison result (HU) is of a second level (iFU<iTU) and the second line current comparison result (HV) is of a second level (iFV<iTV) and the third line current comparison result (HW) is of a first level (iFW>iTW), the first, second and sixth switching power devices are switched to the off condition while the third, fourth and fifth switching power devices are switched to the on condition, and when the first line current comparison result (HU) becomes of a first level prior to the second line current comparison result (HV), the fourth switching power device is switched to the off condition while the first switching power device is switched to the on condition which the conditions remain up to a time-point where the second line current comparison result (HV) becomes of a first level, and then in the subsequent period from the time-point where the second line current comparison result (HV) becomes of a first level up to a time-point of the next state update timing, the first, second and third switching power devices are switched to the off condition while the fourth, fifth and sixth switching power devices are switched to the on condition, whereas when the second line current comparison result (HV) becomes of a first level prior to the first line current comparison result (HU), the fifth switching power device is switched to the off condition while the second switching power device is switched to the on condition which the conditions remain up to a time-point where the first line current comparison result (HU) becomes of a first level, and then in the subsequent period from the time-point where the first line current comparison result (HU) becomes of a first level up to a time-point of the next state update timing, the first, second and third switching power devices are switched to the off condition while the fourth, fifth and sixth switching power devices are switched to the on condition; and at said state update timing, when the first line current comparison result (HU) is of a second level (iFU<iTU) and the second line current comparison result (HV) is of a first level (iFV>iTV) and the third line current comparison result (HW) is of a first level (iFW>iTW), the first, fifth and sixth switching power devices are switched to the off condition while the second, third and fourth switching power devices are switched to the on condition, and when the second line current comparison result (HV) becomes of a second level prior to the third line current comparison result (HW), the second switching power device is switched to the off condition while the fifth switching power device is switched to the on condition which the conditions remain up to a time-point where the third line current comparison result (HW) becomes of a second level, and then in the subsequent period from the time-point where the third line current comparison result (HW) becomes of a second level up to a time-point of the next state update timing, the fourth, fifth and sixth switching power devices are switched to the off condition while the first, second and third switching power devices are switched to the on condition, whereas when the third line current comparison result (HW) becomes of a second level prior to the second line current comparison result (HV), the third switching power device is switched to the off condition while the sixth switching power device is switched to the on condition which the conditions remain up to a time-point where the second line current comparison result (HV) becomes of a second level, and then in the subsequent period from the time-point where the second line current comparison result (HV) becomes of a second level up to a time-point of the next state update timing, the fourth, fifth and sixth switching power devices are switched to the off condition while the first, second and third switching power devices are switched to the on condition; and said state update timing, when the first line current comparison result (HU) is of a first level (iFU>iTU) and the second line current comparison result (HV) is of a second level (iFV<iTV) and the third line current comparison result (HW) is of a first level (iFW>iTW), the second, fourth and sixth switching power devices are switched to the off condition while the first, third and fifth switching power devices are switched to the on condition, and when the third line current comparison result (HW) becomes of a second level prior to the first line current comparison result (HU), the third switching power device is switched to the off condition while the sixth switching power device is switched to the on condition which the conditions remain up to a time-point where the first line current comparison result (HU) becomes of a second level, and then in the subsequent period from the time-point where the first line current comparison result (HU) becomes of a second level up to a time-point of the next state update timing, the fourth, fifth and sixth switching power devices are switched to the off condition while the first, second and third switching power devices are switched to the on condition, whereas when the first line current comparison result (HU) becomes of a second level prior to the third line current comparison result (HW), the first switching power device is switched to the off condition while the fourth switching power device is switched to the on condition which the conditions remain up to a time-point where the third line current comparison result (HW) becomes of a second level, and then in the subsequent period from the time-point where the third line current comparison result (HW) becomes of a second level up to a time-point of the next state update timing, the fourth, fifth and sixth switching power devices are switched to the off condition while the first, second and third switching power devices are switched to the on condition; and at said state update timing, when the first line current comparison result (HU) is of a first level (iFU>iTU) and the second line current comparison result (HV) is of a first level (iFV>iTV) and the third line current comparison result (HW) is of a second level (iFW<iTW), the third, fourth and fifth switching power devices are switched to the off condition while the first, second and sixth switching power devices are switched to the on condition, and when the second line current comparison result (HV) becomes of a second level prior to the first line current comparison result (HU), the second switching power device is switched to the off condition while the fifth switching power device is switched to the on condition which the conditions remain up to a time-point when the first line current comparison result (HU) becomes of a second level, and then in the subsequent period from the time-point where the first line current comparison result (HU) becomes of a second level up to a time-point of the next state update timing, the fourth, fifth and sixth switching power devices are switched to the off condition while the first, second and third switching power devices are switched to the on condition, whereas when the first line current comparison result (HU) becomes of a second level prior to the second line current comparison result (HV), the first switching power device is switched to the off condition while the fourth switching power device is switched to the on condition which the conditions remain up to a time-point where the second line current comparison result (HV) becomes of a second level, and then in the subsequent period from the time-point where the second line current comparison result (HV) becomes of a second level up to a time-point of the next state update timing, the fourth, fifth and sixth switching power devices are switched to the off condition while the first, second and third switching power devices are switched to the on condition.

5. The FWM converter according to any one of claims 1 to 4, wherein the first, second and third comparators (17, 18, 19) are adapted to periodically compare the first, second and third line current instruction values with the first, second and third line current measurement results, respectively, and wherein said current controller (6) further comprises first, second and third double-reading logic circuits (48, 49, 50) respectively interconnected between the first, second and third comparators (17, 18, 19) and the logic circuit (10) adapted such that, in the case where the first, second and third line current measurement results are greater than the first, second and third line current instruction values at least successive two times, respectively, the first, second and third comparators output the first, second and third line current comparison results (HU, HV, HW) of a first level, and whereas, in the case where the first, second and third line current measurement results are smaller than the first, second and third line current instruction values at least successive two times, respectively, the first, second and third comparators output the first, second and third line current comparison results (HU, HV, HW) of a second level, respectively.

6. The PWM converter according to claim 5, wherein the logic circuit further includes first, second and third delay units (56, 57, 58) for delaying switching instruction signals (PU, PV, PW) by predetermined times in accordance with a predetermined rule to be fed to the main circuit power control section (8).

7. The PWM converter according to claim 1, wherein the current instruction generator (7) generates the first, second and third line current instruction signals, each consisting of a sine wave of in-phase or a sine wave of anti-phase with respect to each phase voltage, seen from the neutral point of the three-phase AC power source.

8. The PWM converter according to claim 3, wherein the first, second and third comparators (17, 18, 19) are adapted to periodically compare the first, second and third line current instruction values with the first, second and third line current measurement results, respectively, and wherein said current controller (6) further comprises first, second and third double-reading logic circuits (48, 49, 50) respectively interconnected between the first, second and third comparators (17, 18, 19) and the logic circuit (10) adapted such that, in the case where the first, second and third line current measurement results are greater than the first, second and third line current instruction values at least successive two times, respectively, the first, second and third comparators output the first, second and third line current comparison results (HU, HV, HW) of a first level, and whereas, in the case where the first, second and third line current measurement results are smaller than the first, second and third line current instruction values at least successive two times, respectively, the first, second and third comparators output the first, second and third line current comparison results (HU, HV, HW) of a second level, respectively.

9. The PWM converter according to claim 2, wherein the first, second and third comparators (17, 18, 19) are adapted to periodically compare the first, second and third line current instruction values with the first, second and third line current measurement results, respectively, and wherein said current controller (6) further comprises first, second and third double-reading logic circuits (48, 49, 50) respectively interconnected between the first, second and third comparators (17, 18, 19) and the logic circuit (10) adapted such that, in the case where the first, second and third line current measurement results are greater than the first, second and third line current instruction values at least successive two times, respectively, the first, second and third comparators output the first, second and third line current comparison results (HU, HV, HW) of a first level, and whereas, in the case where the first, second and third line current measurement results are smaller than the first, second and third line current instruction values at least successive two times, respectively, the first, second and third comparators output the first, second and third line current comparison results (HU, HV, HW) of a second level, respectively.

10. The PWM converter according to claim 2, wherein the first, second and third comparators (17, 18, 19) are adapted to periodically compare the first, second and third line current instruction values with the first, second and third line current measurement results, respectively, and wherein said current controller (6) further comprises first, second and third double-reading logic circuits (48, 49, 50) respectively interconnected between the first, second and third comparators (17, 18, 19) and the logic circuit (10) adapted such that, in the case where the first, second and third line current measurement results are greater than the first, second and third line current instruction values at least successive two times, respectively, the first, second and third comparators output the first, second and third line current comparison results (HU, HV, HW) of a first level, and whereas, in the case where the first, second and third line current measurement results are smaller than the first, second and third line current instruction values at least successive two times, respectively, the first, second and third comparators output the first, second and third line current comparison results (HU, HV, HW) of a second level, respectively.

11. The PWM converter according to claim 1, wherein the first, second and third comparators (17, 18, 19) are adapted to periodically compare the first, second and third line current instruction values with the first, second and third line current measurement results, respectively, and wherein said current controller (6) further comprises first, second and third double-reading logic circuits (48, 49, 50) respectively interconnected between the first, second and third comparators (17, 18, 19) and the logic circuit (10) adapted such that, in the case where the first, second and third line current measurement results are greater than the first, second and third line current instruction values at least successive two times, respectively, the first, second and third comparators output the first, second and third line current comparison results (HU, HV, HW) of a first level, and whereas, in the case where the first, second and third line current measurement results are smaller than the first, second and third line current instruction values at least successive two times, respectively, the first, second and third comparators output the first, second and third line current comparison results (HU, HV, HW) of a second level, respectively.

* * * * *